(12) United States Patent
Duxbury

(10) Patent No.: US 8,618,919 B2
(45) Date of Patent: Dec. 31, 2013

(54) LASER DETECTION AND TIMING METHOD AND APPARATUS

(75) Inventor: Bradley James Duxbury, Ipswich (AU)

(73) Assignee: Dux Technologies Pty Ltd, Ipswich, Queensland (AU)

( * ) Notice: Subject to any disclaimer, the term of this patent is extended or adjusted under 35 U.S.C. 154(b) by 219 days.

(21) Appl. No.: 13/377,228

(22) PCT Filed: Jun. 9, 2010

(86) PCT No.: PCT/AU2010/000707
§ 371 (c)(1),
(2), (4) Date: Dec. 9, 2011

(87) PCT Pub. No.: WO2010/141982
PCT Pub. Date: Dec. 16, 2010

(65) Prior Publication Data
US 2012/0082007 A1 Apr. 5, 2012

(30) Foreign Application Priority Data

Jun. 9, 2009 (AU) ................................ 2009902611
Mar. 23, 2010 (AU) ................................ 2010901222

(51) Int. Cl.
G08B 1/00 (2006.01)
G04F 8/00 (2006.01)

(52) U.S. Cl.
USPC ............ 340/323 R; 340/309.16; 368/2; 368/3

(58) Field of Classification Search
USPC .............. 340/286.01, 691.1, 693.5, 933, 936, 340/941, 557, 573.1, 573.3, 309.16, 323 R; 368/2, 3, 10; 348/143, 148, 157, 589
See application file for complete search history.

(56) References Cited

U.S. PATENT DOCUMENTS

| | | | |
|---|---|---|---|
| 4,752,764 A | 6/1988 | Peterson et al. | |
| 5,103,433 A * | 4/1992 | Imhof | 368/9 |
| 5,245,162 A * | 9/1993 | Takahashi | 235/377 |
| 5,436,611 A | 7/1995 | Arlinghaus, Jr. | |
| 6,433,817 B1 * | 8/2002 | Guerra | 348/157 |
| 8,446,467 B2 * | 5/2013 | Tilton et al. | 348/143 |
| 2004/0006445 A1 * | 1/2004 | Paek | 702/178 |
| 2006/0036396 A1 | 2/2006 | Brown | |

FOREIGN PATENT DOCUMENTS

JP 06-027224 A 2/1994

* cited by examiner

Primary Examiner — Anh V La
(74) Attorney, Agent, or Firm — Kirton McConkie; Evan R. Witt

(57) ABSTRACT

Timing apparatus which may be in the form of a stop watch and which includes a laser beam transmitter for transmitting a laser beam and a detector for detecting a reflected laser beam reflected from objects for example runners intercepting the transmitted beam. The apparatus includes a processor for calculating elapsed time of movement of the runners and their finishing order from the reflected signals received by the detector.

23 Claims, 12 Drawing Sheets

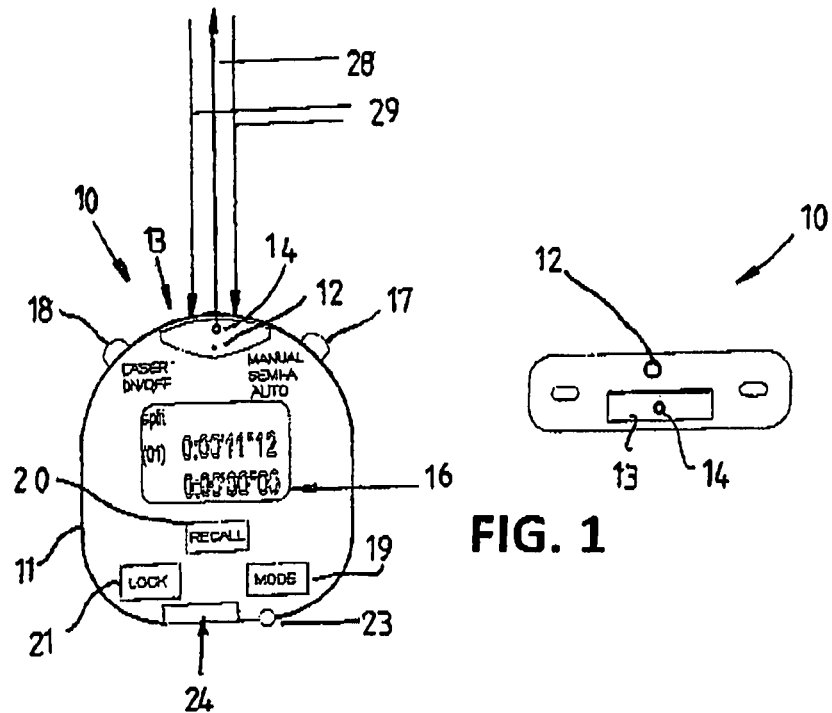
FIG. 1
FIG. 2
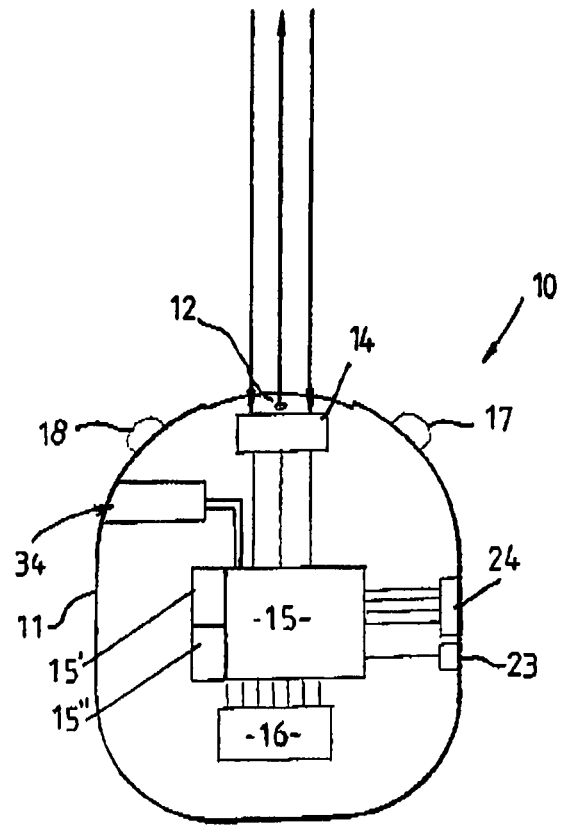
FIG. 3

LASER DETECTION AND TIMING METHOD AND APPARATUS

TECHNICAL FIELD

This invention relates to laser detection and timing method and apparatus. The present invention has particular but not exclusive application to the detecting and/or timing of competitors in athletic or swimming competitions or undertaking training however the invention may be used for detecting and/or timing any moving objects for example vehicles or animals.

BACKGROUND ART

Commonly timing of sprint athletes by coaches is undertaken by the use of digital or non-digital stopwatches with the assistance of helpers timing at the finish line and advising runners of their times. Timing of competitors in school sports and amateur athletic competitions is also undertaken by the use of digital or non-digital stopwatches. Times given to athletes can be quickly forgotten and due to human reactions, the recorded times are usually not accurate and only provide an approximate time In club athletic competitions, there is usually required to be a timekeeper and a place judge for each athlete in a race. For example, if there are eight athletes, there should be eight timekeepers and eight place judges. Timekeepers are usually required to be positioned at different elevations in alignment with the finishing line so that each athlete can be viewed as they finish a race. A timekeeper stand may be located at the finishing line upon which timekeepers can be seated one above the other. Place judges are also provided at the finishing line to judge the order in which athletes cross the line which is then compared with the times recorded by the timekeepers to provide a result. Whilst the use of multiple timekeepers and place judges usually provides a reasonably accurate result, error can still occurs due to slow human reaction time in actuating the stopwatch and peripheral vision problems of fixing on a competitor at speed to judge the movement of the chest of the competitor in crossing the finish line. Errors can also occur where a number of athletes are crossing the line within a short period as the position of one athlete can block the view by a timekeeper of an athlete in an adjacent lane.

Often however the large number of people required to act as timekeepers and place judges are not available and thus the above tasks are often undertaken by a single timekeeper using a single stopwatch to time each competitor as he or she crosses a finish line. Due to the problems referred to above, the results when a single person is timekeeping are usually very inaccurate. Even when there is more than one timekeeper available, timekeeping is often inaccurate. For training purposes, timekeepers are not available and normally a coach is required to carry out timing functions which he or she does it either by himself or herself or with a helper.

Whilst some sophisticated stopwatches are available including stopwatches which have printers to print out results, they are still manually operated and thus suffer from errors caused by human reaction time as referred to above. Other systems have individual timekeeper push button units connected to a central processing unit however these systems also rely on human reaction time for accuracy.

For more sophisticated events, timing of athletes is done electronically with a scanning camera which is set up to monitor the finish line of a track up to the finishing line and a computer programmed with suitably software is used to record the times of athletes and also place athletes at the finish line. Whilst this form of equipment is suitable for the larger athletic meets, the cost involved makes them unsuitable for most training and other athletic meets such as athletic meets involving children at schools and further involves multiple operators to operate the system and manually determine the athlete's torso crossing the finish line from pictures. In more sophisticated systems particularly used for training elite athletes and racing, a set of posts are used to delineate each lane at the finish line and a transmitter and receivers on the posts are used to identify and time runners.

Another field in which timing of athletes is undertaken is in swimming races where timing and finishing order of swimmers in swimming races is typically achieved by the use of touch pads at one or both ends of a swimming pool which are actuated when touched by swimmers finishing a race or turning at an end of the pool. It is relatively common however for swimmers to damage their hands or fingers when touching pads of this type as it is normally necessary to touch the pads with a sufficient force to cause actuation of switches in the pads.

Timing of swimmers whilst undergoing training is usually undertaken by coaches who use manually operable stop watches to time the laps which swimmers swim. It is very difficult however for coaches to determine incremental speed of swimmers when swimming a lap. For example, it would be desirable if a coach could time different increments during a training swim say every ten meters of a lap to improve swimming efficiency and coaching. It would be further desirable if a coach could view or ascertain the trajectory of a swimmer for example when diving from starting blocks into a pool or undertaking a turn at the end of a pool. Although cameras can be used for this purpose, cameras are particularly expensive and usually only available in the larger competition pools.

Timing and finishing order of other objects such as moving vehicles or animals such as horses in a race is also undertaken and although timing is not as crucial as with athletes, it would be desirable to have an effective means for accurately timing such events as well as ensure correct placings.

The present invention aims to address one or more of the above disadvantages of the prior art or at least provide an effective or useful alternative to the prior art.

SUMMARY OF THE INVENTION

According to a first preferred aspect, the present invention provides timing apparatus for determining an elapsed time of movement of one or more movable objects, said apparatus comprising a laser beam transmitter for transmitting a laser beam, a detector for detecting the interception of said transmitted laser beam and processor means for calculating said elapsed time from interception of said object or objects of a laser beam transmitted by said laser beam transmitter as detected by said detector.

The term "object" or "objects" as used throughout the specification and claims includes animate and inanimate objects and thus a moving object or object comprises any moving thing for example a vehicle or boat, a person such as an athlete or swimmer or animal such as a horse or greyhound in a horse or greyhound race.

The invention is described below in relation primarily to the detection and timing of runners or other athletes such as swimmers undergoing training or in a race. It will be appreciated however that the timing apparatus may be applied to the timing of other moving objects such as vehicles or animals.

The timing apparatus maybe provided with a display screen such as a LCD screen or touch screen for display of elapsed time and/or objection details or other information. Alternatively, the timing apparatus may communicate with a remote display means for remote display of elapsed time and/or object details or other information. The remote or local display means may include means for printing the elapsed time and/or object details. Communication with the remote display means may be achieved by wireless communication means or by any other communication system. The apparatus may also include a memory for storing the elapsed time and/or object details.

Preferably the timing apparatus includes one or more internal timers for measuring or determining elapsed time. Thus in the case of runners in a race, the timer or timers may be triggered or read when a race is commenced.

Preferably the detector is adapted to detect reflection of the transmitted laser beam or non-reflection of the transmitted beam.

In a particularly preferred form, the timing apparatus may include a support body for the transmitter and detector and processing means so as to be self contained. The apparatus may be a hand held device which may be in the configuration of a stopwatch for use in athletic or other competitions. The timing apparatus however need not be a hand held device but may also provided or associated with a tripod, stand or other support on which it can be supported at a desired position where timing is required.

In a preferred aspect of the invention, the light beam transmitted by the apparatus may comprise a modulated light beam such as a pulse modulated light beam which will be reflected by objects or persons such as runners as they cross a finish line, increment line or other location where time is to be recorded and the detector is adapted to detect laser beam reflection. Apparatus of this type may further incorporate laser distance measuring techniques such as time of flight or triangulation to define the range of operation of the apparatus and ensure only objects or runners in a prescribed range for example in respective lanes in which runners or athletes are located are detected. Thus movement of extraneous objects will not be detected. Furthermore, by identifying respective lanes, respective runners or athletes can be identified.

When applied to runners or athletes in a race, the crossing of the laser bean transmitted by the timing apparatus by respective runners will result in a series of reflected laser beams corresponding to each runner with the data streams of the reflected beams being received by the timing apparatus and stopping the timers or reading the timers in the apparatus to provide the elapsed time of runners. To avoid detection of other extraneous movements on or near the track or by non-timed runners, the parameters of operation of this form of apparatus may be varied. For example, the range of transmission of the beam may be adjusted to only detect runners passing within a selected range of the apparatus by only stopping or extracting a reading of the internal timers within the apparatus with measurements within that range. Thus other measurements from extraneous sources would not stop the internal timers as they would be outside the settable parameters. Thus the range of the beam could be selected to be 0-2 meters so as to only detect runners within this range and not detect runners beyond this range such as at 3 meters from the timing apparatus. The timing apparatus may also be set to the same parameter as the finish line and obtain all runners times on a track whilst a passersby inside or outside the track cutting the beam will not trigger the internal timers as their parameters would be outside those of the finish line.

The timing apparatus will thus be able in determine from the reflected light signals from respective runners as they cross a finish line as detected by the light detecting means, the order of finish of runners as they cross a finish line. In addition, the elapsed time for each runner can be determined from the reflected signal from that runner as detected by the detector. The timing apparatus is thus able to determine placings in a running race as well as elapsed time of each runner in the running race.

In running races, the front or leading edge of the torso is the part of the body which determines the placings in a race. The processing means can by counting the received pulses determine which part of the body is the torso (in which case a large number of reflected pulses will be received and counted) and which part of the body is not the torso for example an arm (in which case a substantially smaller number of reflected pulses will be received and counted). The longest series of data or pulses received by the detector will equate to the reflection off the torso of a runner with the leading edge of that series of pulse providing an accurate finish order in a race and accurate elapsed time of a runner. Preferably the results arc displayed on the display screen of the timing apparatus as the time and place of each runner in that race.

As referred to above, the timing apparatus suitably includes means for determining from the reflected light signals received by the light detector, the lane in a running track in which a runner is running and from which light is reflected when for example the runner crosses the finish line. The runners in the respective lanes of a running track may be determined by distance measuring techniques such as by time of flight techniques or other measuring techniques for example triangulation. Alternatively phase shift techniques maybe employed by which phase shift of a transmitted modulated signal is compared with that of a reflected signal. Using the above techniques, the time between transmission of a light signal and receipt of the reflected light signal (or phase shift) is equated to distance across a running track which thereby enables determination of the respective lanes in which respective athletes or runners. The lanes can be thus identified by programming the processor by setting parameters for each lane which equate to a distance measurement from the timing apparatus. Selected areas in each lane may be nominated as "dead zones" and the processor means is suitably programmed to be able to discriminate measurements detected from those zones which will not stop or provide a reading of the internal timers for that lane from measurements within the lanes but outside the "dead zones" thereby delineating and separating the lanes. Only measurements detected in the parameters for each lane will stop or provide a reading from internal timers for that lane. This programming of the processor means suitably is adjustable for differing lane track widths and differing numbers of lanes on a running track so that the timing apparatus can be used in any type and design of track.

In an alternative arrangement for lane detection purposes, the laser beam transmitter may transmit multiplexed light beam signals of different frequencies corresponding to a number of lanes and the light detecting means by detecting reflected light signals of a particular frequency can discriminate between runners in different lanes. Thus the laser beam transmitter may transmit eight (8) different signals on the one transmitted beam corresponding to eight (8) lanes of an eight (8) lane running track.

If two or more runners cross a finish line at the same or similar time, the nearest runner to the laser beam transmitter may obstruct the transmitted laser beam from reaching the hidden or shielded runner or runners. The laser beam or beams however will still be reflected off for example an arm or partial torso of a runner providing a short data series reflected signal which will be detected by the light detecting means. This short data series may be used to provide an estimate of the finishing time of a hidden or shielded runner for example a time measured in tenths of a second or if measured in hundredths it will be flagged indicating it may not be exactly accurate thereby still giving the runner an indication of his/her time.

As referred to above, the timing apparatus suitably includes a memory for storing the results of a race and preferably the results arc stored such that past results and records can be retrieved. Preferably also the timing apparatus may be pre-programmed prior to a race or training drill with the names of runners in a race and then a name can be chosen to enter beside a lane in which they are going to run. Thus in this aspect of the invention, the timing apparatus at the completion of a race or training exercise can display on the display means the name of each runner, the placing in a race and their elapsed time thereby being able to build a database for individuals for any event distance they may run creating a history.

In another aspect, the present invention provides a laser stopwatch incorporating the principles of the timing apparatus referred to above, said stopwatch comprising a support body adapted to be hand held, said support body supporting a laser beam transmitter for transmitting a laser beam, a detector for detecting a reflected laser beam and processor means for calculating said elapsed time from interception of said object or objects of a laser beam transmitted by said laser beam transmitter and reflected to said detector.

The support body may include display means for displaying the elapsed time or times and/or object details.

Suitably the laser beam transmitter is adapted to transmit a pulse modulated laser beam and the processor means is adapted to determine and identify from laser beam signals reflected from the object or objects when the object or objects intercepts the transmitted laser beam and received by the detector, an object or objects and the elapsed time thereof. Preferably the processor means which is suitably programmable identifies the object or objects by distance measurement techniques. Preferably the elapsed time is determined from a start time.

Preferably the support body includes means for manually setting the start time. Preferably communication means are provided for providing communication of the laser stopwatch with remote actuation means adapted to remotely set the start time. Suitably the communication means is adapted to communicate a start signal to the stopwatch from a remote starter. The remote starter may comprise one of a starting gun or an automatic self-starter.

In a further preferred aspect, the present invention provides timing apparatus for timing and identifying athletes or runners undergoing training or in a race, said apparatus comprising distance measuring means for measuring or determining the distance of said apparatus from runners in accordance with reflected signals received from said athletes or runners to identify said runners from the distance of said runners from said apparatus and the times associated therewith.

The distance measuring means suitably comprises laser distance measuring means. The laser distance measuring means suitably comprises a laser transmitter and a detector for receiving reflected laser signals and timer means triggered by receipt of reflected signals from runners or athletes to provide said times associated with respective said runners or athletes.

The athletes or runners are suitably located in respective lanes and the distance measuring means is adapted to identify respective lanes by distance from the apparatus and thereby the runners or athletes in those lanes.

Preferably the laser transmitter is adapted to transmit a pulse modulated laser beam and the apparatus is adapted to determine the finishing or incremental order of athletes or runners by detecting and identify the longest set of reflected data signals corresponding to the torso of athletes or runners.

According to a further aspect, the present invention provides a method of determining an elapsed time of movement of one or more movable objects, said method including the steps of transmitting a laser beam across a path of movement of said object or objects, and calculating said elapsed time by detecting the interception of said object or objects of a laser beam transmitted by said laser beam transmitter.

Preferably the step of transmitting the laser beam comprises the step of transmitting a pulse modulated laser beam. Preferably the method also includes the step of identifying the object or objects by identifying the distance of said object or objects across the path of movement. Preferably the step of identifying the distance of said object across the path of movement comprises the step of using time of flight calculations or triangular calculations to identify said distance.

In another preferred aspect, the present invention provides a timing system comprising timing apparatus for determining or measuring an elapsed time of movement of one or more movable objects, said apparatus comprising a laser beam transmitter for transmitting a laser beam, a detector for detecting a reflected laser beam, remote actuating means for setting a start time of movement of said one or more said movable objects and processor means for calculating said elapsed time from said start time from interception of said object or objects of a laser beam transmitted by said laser beam transmitter and receipt of reflected laser beam signals by said detector The remote actuating means may comprise a self starter which in addition to providing a starting signal to runners which may comprise verbal start commands or a beep and/or a flash, simultaneously transmits a triggering start time signal to the timing apparatus to commence the timing operation of the timing apparatus.

The remote actuating means in another form comprises a starting gun for starting an athletic or other competition such that when the starting gun is triggered to start a race, a simultaneous triggering start time signal will be transmitted to the timing apparatus to start the timing of runners from the time of triggering of the starting gun. Preferably the timing apparatus and starting guns include transceivers to permit wireless communications therebetween. The starting gun may be provided with an electronic beep and/or flash facility which is actuated on starting and further may include means to transmit data for receipt by the timing apparatus or other receiver.

In another aspect, the starting gun includes display means such as an LCD display screen and the timing apparatus may transmit finishing signals generated by respective runners crossing a finishing line to the starting gun for display of results on the display screen of the starting gun. Thus the timing apparatus may be set up at a finishing line and a starting gun as described above used for starting a race and receiving and recording elapsed times of runners as they cross a finish line as transmitted by the timing apparatus back to the starting gun. This operation therefore can be carried out as a one-person operation.

In a simplified form using a laser beam transmitter which can transmit a non-modulated beam, a reflector may be provided to reflect the laser beam for receipt by the light detector means. Thus the laser beam may be transmitted from one end of a finish line on one side of a track and reflected from a reflector at the opposite end of the finish line on the opposite side of the track. Interception of the beam by a runner crossing the finish line will be able to be detected by the detector through non-receipt of the reflected beam and thereby provide a timing signal indicating a time at which a runner crosses the finish line. Apparatus of this type is particularly suitable for measuring elapsed time of runners.

The present invention in yet another aspect provides pacing apparatus for providing pace training for a runner on a running track, said pacing apparatus including a plurality of light assemblies adapted to be located at selected positions around a running track and means for sequentially triggering said light assemblies at intervals to cause selective emission of pacing signals from said light assemblies to enable an athlete on the running track to be aware of a required pace on the running track.

The light assemblies may emit light such as a flash of light upon being triggered. The light assemblies may additionally or alternatively emit a sound signal or beep. The light assemblies suitably comprise portable self contained assemblies and suitably the light assemblies are triggered by wireless signals. Preferably the wireless signals are transmitted from a starting gun at the selected intervals to cause triggering of the light assemblies. Thus in addition to starting a pacing session, sequential triggering signals will be transmitted to the light assemblies to cause sequential actuation thereof along the running track.

In another form, the light assemblies may be associated with timing apparatus of the above described type to enable incremental time signals of runners along the track to be detected. The time signals may be transmitted to the starting gun for recording therein. The timing apparatus may be incorporated within the light assemblies.

The present invention provides in a further preferred aspect, laser detection apparatus for detecting athletes of other persons undergoing a race or during training, said apparatus including a plurality of laser beam transmitters for transmitting respective laser beams and receiving means for receiving and detecting respective said laser beams reflected from an athlete or other person undergoing a race or training so as to detect the presence of an athlete or person passing said transmitted laser beams, said laser beam transmitters being arranged at vertically spaced apart positions.

Preferably the laser detection apparatus is incorporated in or associated with timing apparatus which for example enables the finishing or increment time of an athlete or person to be determined from the respected. laser beam signals reflected from the athlete or person.

Typically the detection apparatus has at least two laser beam transmitters with one transmitter being arranged substantially vertically above the other whereby laser beams at different horizontal levels can be transmitted. Typically the laser beam transmitters are provided at the finish line of an athletic track or course to transmit respective laser beams across the track or course parallel to the finish line.

Laser detection apparatus of this form is particularly suitable for use with athletes of different heights as the use of a plurality of laser beam transmitters ensures that a correct time reading of athletes intersecting the laser beams transmitted by the transmitters can he achieved. A correct finishing reading in a race occurs when the leading part of the torso of an athlete crossing the finishing line is detected and by using a plurality of laser beams one above the other, the apparatus can ensure that a correct torso reading of an athlete passing the finishing line is obtained.

The detection apparatus suitably is provided or associated with processor means which can analyse the reflected laser beam signals received by the laser receiver means to determine which reflected beam has detected the torso of a person or athlete crossing the finish line so as to enable the correct finishing order of persons or athletes crossing the finish line to be obtained.

Typically the laser beams transmitters are arranged at a 10 cm vertical spacing to transmit substantially horizontal laser beams 10 cm apart however the laser beam transmitters may be arranged at various spacings. The spacing between respective transmitters may be the same or where there are more than two laser beam transmitters, the spacing may be the same or may be varied.

The laser beam transmitters and associated receivers may be arranged along a post, bollard or other elongated member which may be erected substantially upright for example at the finish line of a track to serve as a finish post. The laser beam transmitters and associated receivers however may be arranged at positions around or along a track so that incremental detection and timing of athletes or persons undergoing a race or training can be achieved. Typically the central laser beam transmitter is arranged at the height of the mid-range of athletes or persons with the other transmitters arranged above and below that height.

In a particularly preferred form suited for athletes or persons of widely varying heights for example children, the plurality of laser beam transmitters (and receivers) may be arranged for vertical adjustment to suit the range or persons of different heights. For this purpose, the laser beam transmitters (and receivers) are mounted on a common support member which may be adjusted vertically in opposite directions. The common support member may be mounted to a post normally arranged in an upright position and may be slidable therelong in opposite directly. Means may be provided to fix the common support member at a selected set position along the post. Such means may comprise a simple clamp screw. Alternatively, the post or support member may be provided with a series of vertically spaced apertures and the support member or post provided with a single aperture such that a locking pin can be inserted between aligned apertures in the support member and post to set the height of the support member as required.

The laser beam transmitters may transmit pulse modulated light beams which will be reflected by athletes or other persons as they cross the finish line. Preferably transmission of the laser light beams is synchronised with pulsed signals transmitted thereby in phase. Different reflections from different parts of the bodies will enable the leading part of the torso of a body to he detected. Thus if there is reflection from an arm of a person, only a limited number of pulse reflections will occur corresponding to the width of an arm. When there is reflection from the torso of a person, there will be a larger number of pulse reflections indicative of the larger width of the torso. Detection of pulse reflections from the torso can thus be discriminated from detection of pulse reflections from the arm or other parts of the body of the person.

Preferably processing means are provided to process the reflected signals received by the receiver means. The processing means suitably comprises a programmed computer which can carry out the above functions. Preferably the processing means provides an output which can he displayed on a display screen, printed out or wirelessly transmitted. Thus in the case of a race, the processing means may provide finishing order in a race and associated times. Preferably the processing means or computer includes a clock which is triggered at the start of a race for example by connection directly or indirectly to the starter with the clock being read when triggered by the received reflected laser beams from respectively athletes.

Where there is sufficient pulse rate transmission for example 1 KHz or above a sampling at every 1 mm, an outline of the body of the person can be established by the processing means and displayed on a screen or printout. This is particularly effective where there are a plurality of laser beam transmitters and receivers one above the other which transmit synchronised pulse signals. Thus effectively the apparatus will be equivalent to providing a photo finish of a race and may be used as a substitute for photo finish apparatus.

The present invention in a further preferred aspect provides detection apparatus for use in detecting swimmers in a swimming pool, said apparatus including at least one laser beam transmitter for transmitting a laser beams across a swimming pool, and means for detecting said transmitted laser beam reflected from swimmers in said pool.

Preferably the apparatus includes a plurality of laser beam transmitters for transmitting respective laser beams across a swimming pool, means for detecting said transmitted laser beams reflected from swimmers in said pool with the laser beam transmitters are arranged at vertically spaced apart positions The present invention in this aspect has particular application to detecting swimmers touching an end wall of the pool but be used for detecting swimmers in other parts of the pool for example for detecting swimmers at incremental locations along the pool.

Thus in one preferred aspect, the plurality of laser beam transmitters are arranged at at least one side of a swimming lane at an end or finishing wall of a swimming pool to transmit laser beams across the lane and substantially parallel to the end or finishing wall of the pool. In addition, the laser beams are suitably transmitted along or immediately adjacent to the pool wall of the pool so as to detect by reflection of the laser beam/s, the first swimmer in a swimming race touching the end or finishing wall of the pool. Alternatively, the laser beam transmitters may be arranged at one side of the pool to direct laser beams along the end wall of the pool to detect swimmers in each lane of the pool.

Preferably the detecting means comprise laser receivers suitably associated with respective transmitters. Preferably the detecting means are adapted to receive laser beams reflected from respective swimmers in each lane which enables swimmers in each lane to be detected and identified for example by time of flight techniques.

The laser beam transmitters are suitably arranged to so as to be both above the level of pool water and below the level of the pool water so as to detect not only swimmers touching the wall below water level but above the water level.

Preferably the laser beam transmitters (and receivers) are mounted on an upright support member mounted or mountable to the end and/or side wall of the pool. Alternatively, the laser beam transmitters may be mounted on or be set within the pool wall. For more accurate sensing, a plurality of laser beam transmitters may be provided in respective sets on opposite sides of a lane to direct laser beams towards each other. The laser beam transmitters in each set may be arranged in opposing relationship to each other to transmit laser beams in the same horizontal plane. Alternatively, the laser beams from one set may be interleaved or alternate with laser beams transmitted by the laser beams in the other set.

Where pairs of laser beams are transmitted from each side of a swimming lane, the respective laser beam transmitters (and receivers) of each set may be mounted on opposite sides of a common elongated support member which is mounted in an upright position on the side of one lane. The elongated member maybe hollow and the laser beam transmitters (and receivers) mounted in ports suitably waterproof ports in the member.

So as to discriminate between possible reflections of laser beams from bubbles in the pool, infrared detection means may be provided to distinguish between reflection from bubbles (which will be at the same temperature of the water in the pool) and reflection from part of a swimmer at body temperature. The infrared detection means may comprise passive infrared detection means to detect the heat of a swimmer's body. Alternatively, the detection means may comprise active infrared detection means.

The laser detection apparatus as used in swimming pools suitably is associated with timing apparatus whereby the time for example finishing time or incremental time of a swimmer when detected by the detection apparatus can be determined.

In another preferred aspect, the present invention provides a plurality of laser detection apparatuses arranged at spaced apart positions along a swimming pool. Preferably each detection apparatus includes one or more laser beam transmitters arranged to transmit a laser beam across the pool to detect swimmers swimming along the pool. Preferably the one or more laser beam transmitters are arranged one above the other in a set with each set being spaced apart longitudinally of the pool. Each set of laser beam transmitters may be provided in or on an upright support member fixed to a side wall of the pool so as to transmit a series of laser beams one above the other across the pool at spaced positions along the pool. Alternatively each set of laser beam transmitters may be set within the pool for example in upright recesses in the pool wall. In yet an alternative embodiment, laser beam transmitters (and associated receivers) may be incorporated into the pool wall during the construction thereof or as a retrofit.

Swimmers may carry on the swimming costumes or suits, identification means which can be read by the transmitted laser beams to allow for identification of swimmers who may be swimming in a particular lane. Alternatively or additionally where swimmers are swimming in different lanes, time of flight techniques may be used for identifying respective swimmers in respective lanes.

In yet an alternative arrangement, laser beam transmitters may be provided on or in the floor of a swimming pool to transmit laser beams upwardly, the laser beam transmitters being arranged at spaced positions longitudinally of the pool and in one or more lanes so that swimmers in the one or more lanes can be detected by the reflected laser beams received by the laser receivers associated with the transmitters.

BRIEF DESCRIPTION OF THE DRAWINGS

Reference will now be made to the accompanying drawings which illustrate preferred embodiments of the invention described in relation to athletes and swimmers. It will be appreciated however that the following description is not limited to such applications. In the drawings:

FIG. 1 illustrates schematically a first basic embodiment of timing apparatus according to the present invention;

FIG. 2 is a front view of the timing apparatus of FIG. 1;

FIG. 3 is a schematic block diagram of the timing apparatus of FIGS. 1 and 2;

DESCRIPTION OF THE PREFERRED EMBODIMENTS

Figure 4:
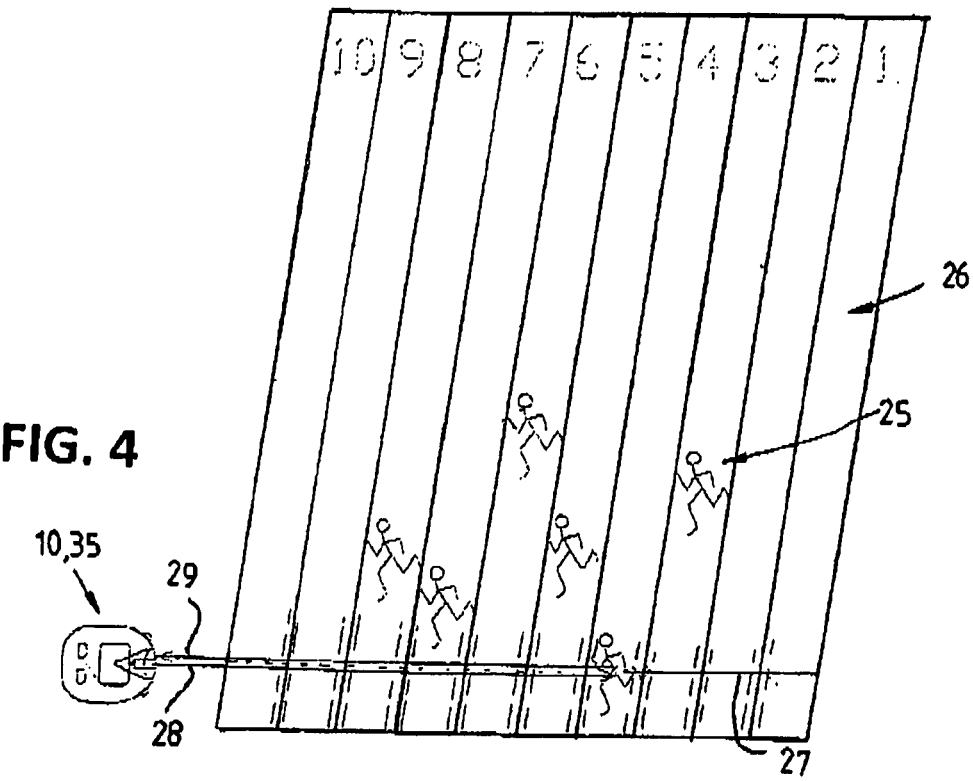
FIG. 4 illustrates schematically the typical manner in which the timing apparatus of FIGS. 1 and 2 or FIG. 6 can be used.

Referring to the drawings and firstly to FIGS. 1 to 3, there is illustrated timing apparatus 10 according to an embodiment of the invention which comprises hand held apparatus in the configuration of a standard stop watch. The apparatus 10 includes a casing 11 supporting a laser transmitter in the form of a laser diode 12 at the front of the casing 11 for emitting a modulated laser beam and a lens 13 for receiving reflected laser light signals and concentrating the received light signals on a photo-detector or other light sensor or detector 14. A software programmable controller or processor 15 is provided within the casing 11 and connected to the laser diode 12 and detector 14 to control the operation of the laser diode 12 and to receive and process signals from the detector 14 indicating when reflected laser light is detected by the detector 14. The casing 11 additionally carries a display screen 16 such as an LCD display screen on which times or other information may be displayed under control of the processor 15. The easing 11 also carries an on-off switch 17 for starting the timing operation of the apparatus and an on-off switch 18 for switching the laser diode 12 on or off. A mode switch 19 connected to the processor 15 is also provided on the casing 11 to enable the mode of operation of the apparatus 10 to be selected such as event distance, lane ability, editing, historical data etc. as described further below.

The processor 15 includes an internal timer 15' for time calculations and a memory 15" in which results may be recorded for recall and display on the display screen 16 by operation of a recall switch 20 also provided on the casing 11. A lock switch 21 is provided on the casing 11 and also connected to the processor 15, the purpose of which will be described below. An output port 23 is connected to the processor 15 to allow for information stored in the controller memory 15" to be downloaded. The casing 11 also carries a USB port 24 connected to the processor 15 for connection to other apparatus. The timing apparatus 10 may also include a transceiver 34 the purpose of which will be described further below. The apparatus 10 is self contained with power for the components thereof provided by an internal battery which may be rechargeable.

In use and as shown in FIG. 4 in application to a running race where a number of athletes 25 are running in marked lanes 26, the timing apparatus 10 can be used by setting it up on one side of the track and in alignment with a finishing line 27. The user, upon switching the apparatus 10 on by use of the switch 17, aims the modulated laser beam 28 emitted from the laser diode 12 across and in alignment with the finishing line 27 and at a height to intercept the athlete's torsos so as to be reflected thereby. The apparatus 10 as described above may measure times by simply adjusting the measurement range parameters to detect an athlete crossing the beam within a preset range. In this application it is not essential to identify the runners in each lane but only the time for each runner, with any reflected measurement data causing the internal timers 15' to be stopped or read within the apparatus 10 to provide the elapsed time readings.

At the start of a race, the user presses the start-stop switch 17 of the apparatus 10 upon the user seeing a flash indicating the firing of a starter's gun which causes the processor 15 to start the timer 15' or takes a reading of the timer 15' to commence timing of the race. When the athletes cross the finishing line 27, the transmitted laser beam 28 will be intercepted by the torso of each athlete 25 in turn and be reflected upon striking each athlete 25 in turn as they cross the finishing line 27 with the reflected beam 29 being received and sensed by the photo-detector 14. Sensing by the photo-detector 14 of each reflected laser beam 29 will be recorded by the processor 15 which will calculate from the start time a listing of elapsed times which correspond to each athlete crossing the finishing line 27. The time of each athlete as they cross the finishing line 27 will thus be recorded in the memory of the processor 15 within the apparatus 10. This information is stored in the memory 15" of the processor 15 and can be recalled by operation of the recall switch 20 so that results of the race or for example results of previous heats of a race can be viewed on the display screen 16.

If the race is a continuing race involving a number of laps with athletes crossing the finishing line 27 a number of times before finishing the race, such as any race above 400 meters where all runners cross out of their lanes to the inside lanes of the track, the timing apparatus 10 will have a feature for official races above 400 meters which will require an operator by means of the button 18 or remote device to turn on the laser beam transmitter or diode 14 as a runner approaches the finish line only to record finish times of each participant. In the case of a training session, lap times may be similarly recorded. The transmitted laser beam 28 will detect each athlete by reflection to the detector 14 as they cross the line 27 and this information will be recorded in the processor memory 15' as a finish or lap time for each athlete. After the race is finished, the user may stop the operation of the apparatus 10 and recall the results for display on the display screen 16 or reset the apparatus 10 for the next race.

The timing apparatus 10 illustrated in FIGS. 1 and 2 is similar in configuration to a standard stop watch and used in a similar manner although it is not necessary to trigger the timing apparatus 10 as runners cross the line 27 as this is recorded by reflection of the transmitted laser beam 28 off the athletes torso which is detected by the photo-detector 14. To ensure false readings do not occur through false triggering of the apparatus 10 due to reflections of the laser beam off the athletes arms or legs, the processor 15 can filter out the false signals by suitable algorithms which will discriminate true signals from false signals. False signals however may also be used to provide an estimate of time of one runner in a race who finishes close to another runner and where reflected signals off his or her torso are not possible due to the beam being blocked by the other runner. In these circumstances, a "false" signal off the one runner's arms or legs will provide an estimate of a finishing time.

The timing apparatus 10 whilst being capable of being hand held as described above may also be mounted on a stand such as on a tripod and set up in a fixed position so that the laser beam can be transmitted across the finishing or lap line 27 as above.

To enable results of a race to be printed out or stored, the output ports 23 and/or 24 of the apparatus 10 may be connected to a printer or computer which can upload the information from the apparatus 10.

Figure 5:
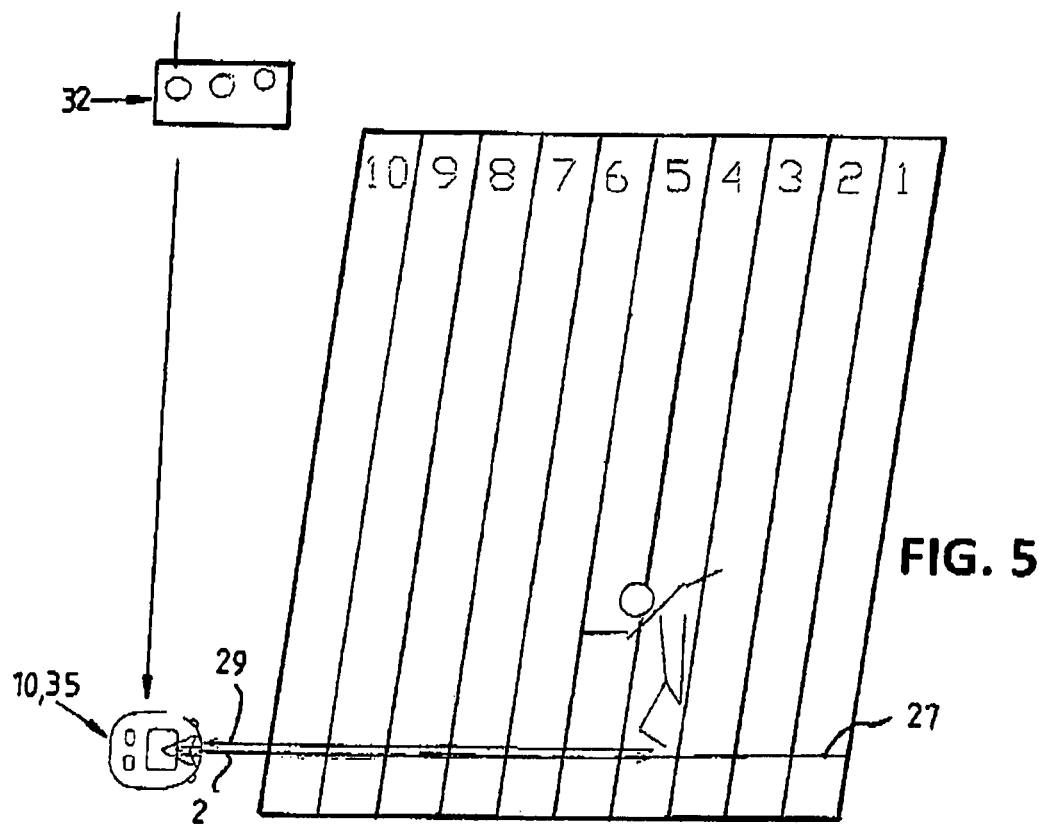
FIG. 5 illustrates the manner in which the timing apparatus of the invention may be used in a self-starting mode.

The timing apparatus 10 may furthermore be operated in a "self-starting" mode where required for individual training as shown in FIG. 5. In this case the timing apparatus 10 is used in conjunction with a starting unit 32 which wirelessly communicates with the timing apparatus 10. In use, a runner at the start of a running track starts the unit 32. The starting unit 32 includes a memory which stores a series of starting commands. Those commands may be similar to the normal word commands as encountered in a race, for example "on your marks"... "set"... and then a start signal (such as a bang, an audible siren or simply the words "go") which are issued from a speaker within the unit 32. Alternatively or additionally the unit 32 may carry starting lights which can be seen by the athlete. The starting unit 32 also includes a transmitter to wirelessly transmit a start time signal for receipt by the timing apparatus 10 which is transmitted at the same time the start signal is generated or issued by the unit 32. When the runner starts the unit 32, the starting commands and start signal are generated at a random timing.

The timing apparatus 10 can be set up in a fixed position at the finishing or lap line 27 and when the unit 32 transmits a starting signal, the apparatus 10 will commence timing and then record the time that the athlete intercepts the transmitted laser beam 28 by detection of the reflected beam 29 as described above at the finishing line 27. The athlete is thus able to train by himself or herself and accurately record their times as they cross the line 27.

The wireless transmitter or transceiver 34 of the apparatus 10 enables the data recorded by the apparatus 0 to be wirelessly transmitted for receipt by other compatible timing apparatuses 10 having a compatible receiver or transceiver 34. Other persons who have a timing apparatus 10 or other compatible device with a receiver or transceiver 34 are therefore able to see the results of the race without being in the vicinity of the finish or lap line 27. Thus unwanted crowding of persons in the vicinity of the finishing line will be avoided.

The apparatus 10 in addition to measuring elapsed time also may be configured to identify the lane 25 in which each athlete is running as they cross the finishing or lap line 27 to enable recording of the time and place of an athlete in a race. This is achieved by the processor 15 using distance measuring techniques such as time of flight techniques by recording the time between transmission of the laser beam 28 and receipt of the reflected laser beam 29 which will equate to the distance between the timing apparatus 10 and one of the lanes 25. Thus in the embodiment of FIG. 4, timing apparatus 35 of the type illustrated in FIG. 6 (as described further below) is used and the time between transmission of the laser beam 28 and receipt of a reflected laser beam 29 from an athlete in lane 10 will be less than the time between transmission of the laser beam 28 and receipt of a reflected laser beam 29 from a runner in lane 1. Measurement of these times therefore provides an identification of lanes to enable individual athletes to be identified and linked to their recorded times.

To clearly discriminate between lanes and runners in lanes, areas between each lane are designated as "dead zones" as indicated in dotted outline in FIG. 4. The timing apparatus 10 in this case is adjusted so as not to detect or not to use signals in those zones to stop or read the internal timers 15' in the apparatus 10. Thus only measurements detected in lanes between the dead zones are taken. This multiple range adjustment feature is adjustable for differing lane track widths and differing numbers of lanes on a running track.

In another arrangement, the timing apparatus may use multiplexed time of flight techniques where different signals corresponding to different lanes of a running track may be transmitted by the apparatus 35 with the reflected signals received by the apparatus 10 indicating the place of an athlete in a race. In an alternative method of lane identification, distance measuring techniques such as triangulation may be employed. In this case, the laser beam transmitter or diode 12 may be offset a set known distance laterally from the photo-receiver 14 which enables the particular lanes to be identified by simple triangulation calculations.

Figure 6:
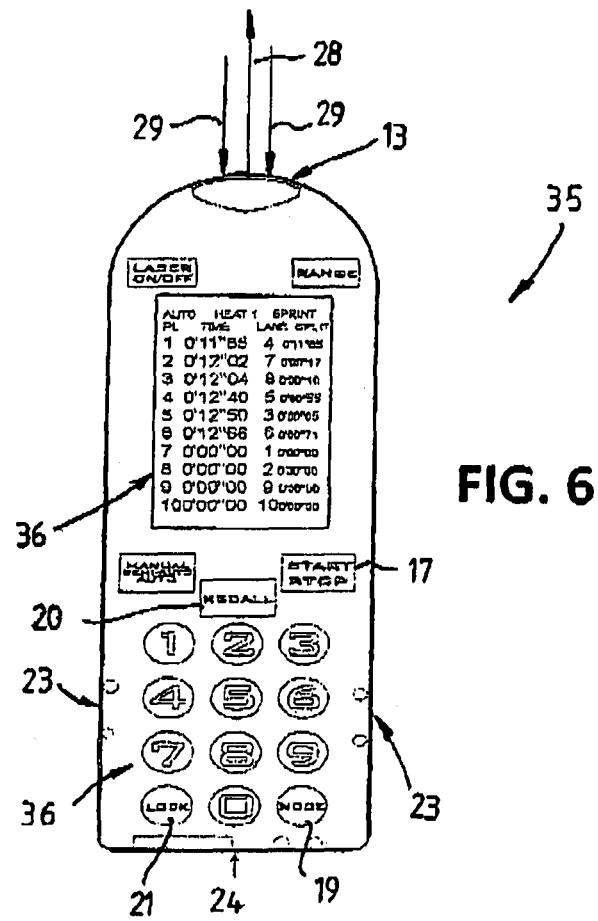
FIG. 6 illustrates a further embodiment of timing apparatus according to the invention.

FIG. 6 illustrates a further embodiment of self-contained timing apparatus 35 according to the invention which is battery powered and similar to the embodiment of FIGS. 1 and 2 and thus like components have been given like numerals. The apparatus 35 may also be used in the applications described in FIGS. 4 and 5. The apparatus 35 has an enlarged display screen 36 which can display a larger range of information, in this case ten actual times for the placing of ten athletes in a race. These may be derived from the time measurement and lane identification techniques described above with reference to the apparatus 10. Alternatively, ten historical personal times of a single athlete can be retrieved from memory and displayed for a training record of the athlete. The apparatus 35 in addition includes an alphanumeric keypad 36' which enables various calculations to be carried out as displayed on the display screen 36. Thus an operator may use the keypad 36' to calculate differences in recorded times between different athletes or differences in recorded times of one athlete on different days or for the editing of names to lane results. Of course the keypad 36' may be used to carry out a large range of mathematical calculations as required.

The apparatus 35 may additionally be used in combination with a self starting unit 32 in the same manner as described with reference to FIG. 5 and in this case it will be apparent that the self starting unit 32 can be used with a number of runners in a race with the apparatus 35 timing each runner and recording the place of each runner at the finish line. The apparatus 35 may also include a transceiver 34 as described with reference to FIG. 3 to enable transmission of results to a remote receiver or other compatible apparatus 35 having a similar transceiver 34.

Figure 7:
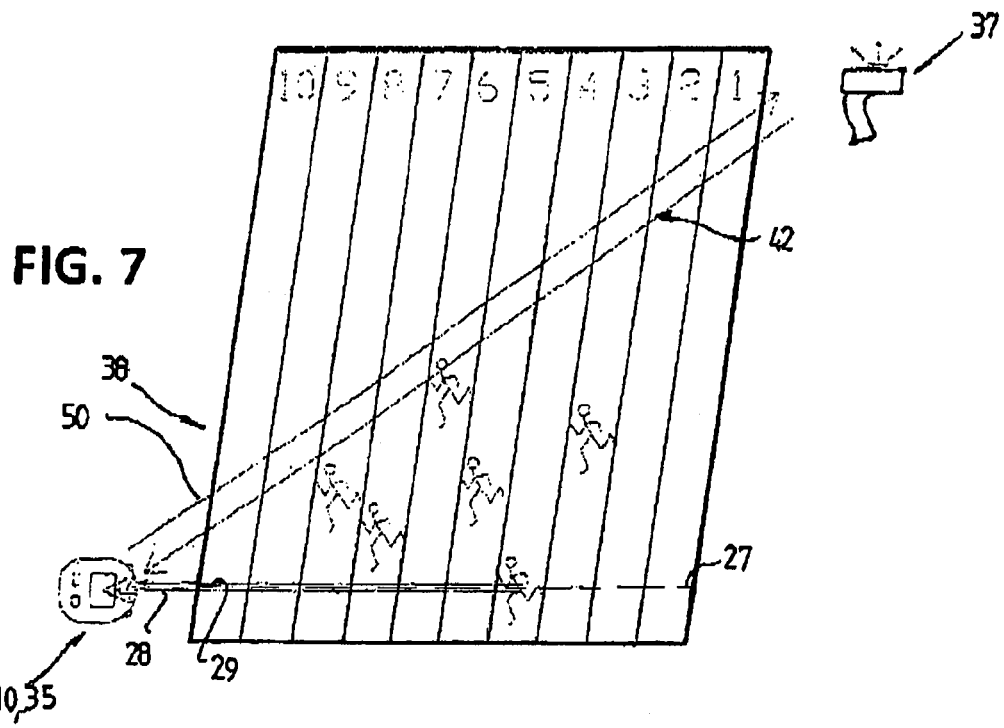
FIG. 7 illustrates schematically a timing system using a starter's gun and timing apparatus of the type illustrated in FIG. 1 to 3 or 6.
Figure 10:
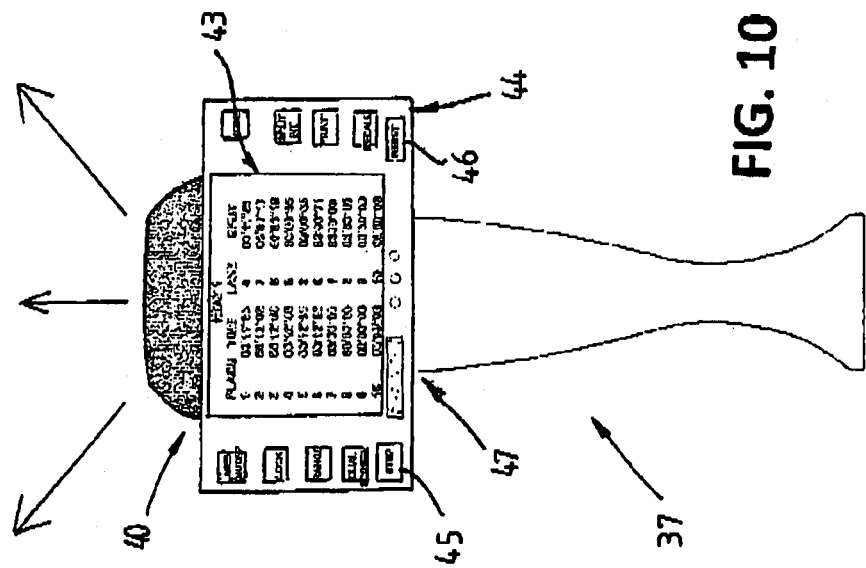
FIGS. 9 and 10 illustrate in side and rear views, the starter's gun as used in the system of FIG. 6 with FIG. 9 showing in dotted outline, a laser beam transmitter and detector on the gun.
Figure 9:
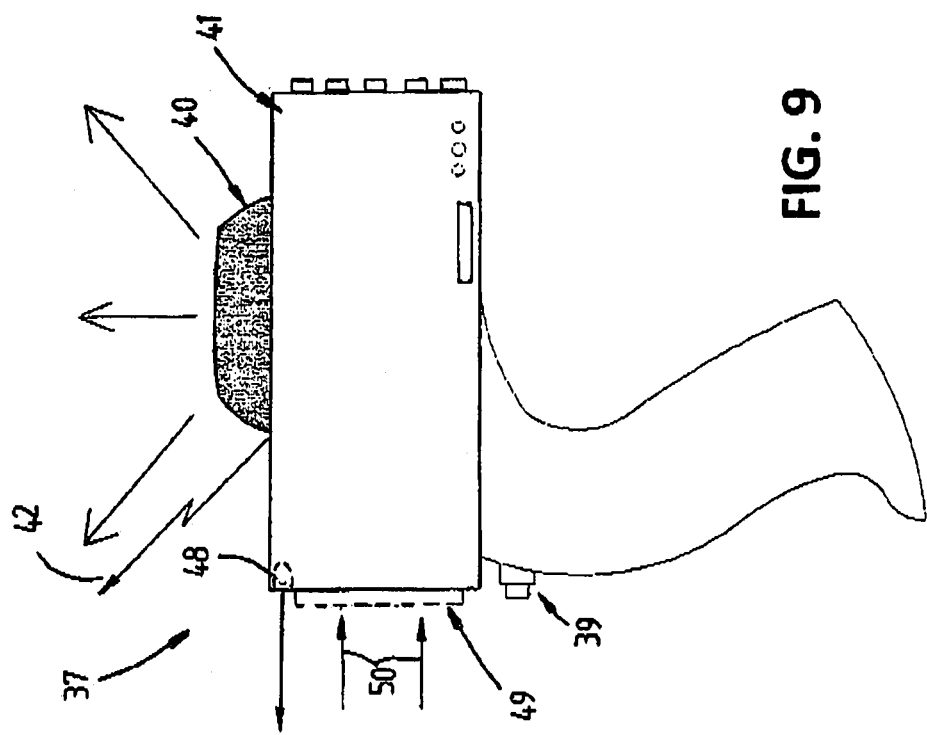

The receiver or transceivers 34 of the timing apparatus 10 (or apparatus 35) may also be used for the remote triggering of the apparatus 10 (or 35) automatically by a starter's gun 37 (rather than manually by the operator) to form a timing system 38 as shown in FIG. 7. In this configuration, the starter's gun 37 (as shown in FIGS. 9 and 10 is provided with a start button 39, an emitter 40 which emits an audible tone and visible flash on depression of the start button 39 and a wireless transmitter or transceiver 41 which transmits a wireless starting signal when the start button 39 is operated.

For receipt of the starting signal emitted by the starter's gun 37, the timing apparatus 10 (or 35) is set to automatic mode by pressing of the mode switch 19. The timing apparatus 10 (or 35) can either be hand held or set up on a stand or tripod at the finishing line 27 as above. Thus when the starter's gun 37 is fired by pressing the start button 39, an audible tone and visible flash is emitted by the emitter 40 to start the race. At the same time, a start signal 42 is wirelessly transmitted by the transmitter or transceiver 41 for receipt in the receiver or transceiver 34 of the apparatus 10 (or 35) which will be detected by the processor 15 to start the timing operation of the apparatus 10 (or 35). Athletes crossing the finish line 27 will intercept the laser beam 28 and create the reflected beam 29 which will be detected by the apparatus 10 (or 35) such that the times of each athlete crossing the finish (or lap) line 27 are recorded as above and stored in the controller memory 15" of the apparatus 10 (or 35).

Figure 8:
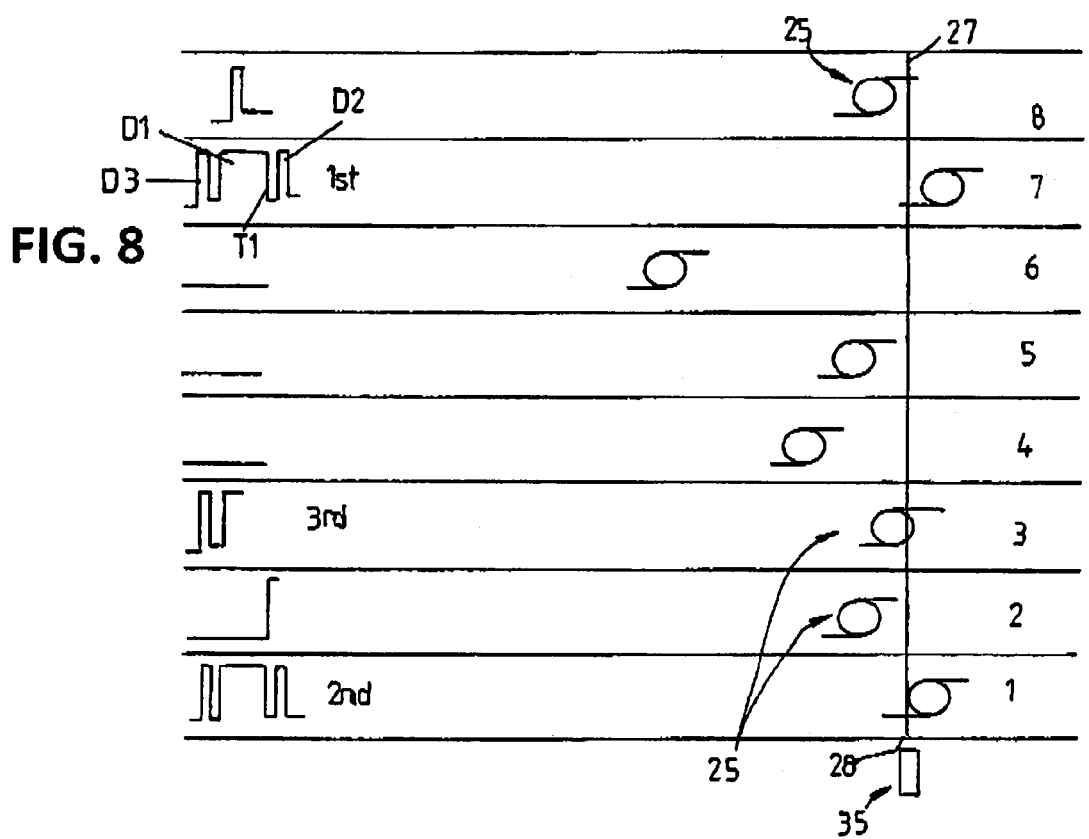
FIG. 8 illustrates the manner in which runners in different lanes are identified by the timing apparatus of FIG. 6.

FIG. 8 illustrates how different runners 25 in different lanes 26 of a running track can be identified and placed and timed using the timing apparatus 35. The apparatus 35 transmits a laser beam 28 as before across the finishing line 27 and receives reflected signals 29 from runners 25 as they cross the finishing line 27. A runner in a lane will cut across or intercept the laser beam at the finishing line and reflected light signals will be sent back to the apparatus 35. The data received will be a measurement from the apparatus 35 which will equate to the parameters of a lane and therefore identify that lane. Furthermore, each series of data or pulses received will stop or cause a reading of internal timers in the apparatus 35 and the longest data series will provide the time displayed with the time usually taken from the leading edge of the data signal. The received reflected data signals are sampled at prescribed intervals to enable the torso of a runner to be distinguished from for example the arms of a runner. Sampling of the reflected signals carried out to equate to every 5 mm of a runner will usually provide sufficient accuracy to enable the torso to be distinguished from other parts of the runners and therefore accurate time of a runner to be measured. The sampling rate of the reflected signals however can be varied to equate to more or less than every 5 mm of a runner.

In the case illustrated in FIG. 8, the first runner 25 across the line is the runner in lane 7. The data from the runner in this lane will have a measurement value which will equate to lane 7 and the data pulse signals received by the apparatus 35 will have stopped the clock in the apparatus 35 on each leading pulse edge. The longest series of pulses or data marked D1 will equate to reflection off the torso of the runner in lane 7 and the leading edge T1 of the leading pulse of the data series D1 will provide a measurement of the elapsed time in the race for that runner. The data series or signals D2 and D3 represent the leading and trailing arms of the runner in lane 7 which are non-valid readings for time or place determination.

The runner in lane 1 will reflect data signals similar to the runner in lane 7 and the data from this lane will have a measurement value which will equate to lane 1 and its longest series of pulses will give the runner second place and a time measured at the leading edge of the leading pulse of that series.

The signals reflected by the runner in lane 3 and received by the apparatus 35 will be the runner in third place however his torso will block the transmission of signals from the apparatus 35 to the runner in lane 8. In this case therefore, the timing apparatus 35 will not receive a long series of pulses indicative of a torso of the runner but only a short series of pulses as indicated. Thus although the runner in lane 8 can be identified as coming fourth because of the receipt of a reflected signal by the apparatus 35, the signal received will not be an accurate reading of the time For example that runner's finishing time may be measured in tenths and not hundreds of a second. For training or for children's sporting events however, this measurement is usually sufficient and judges could be used to verify and edit if necessary.

The runner in lane 2 will not have his signal obstructed and thus his time reading and placing will be accurate. The signal to the runner in lane 5 however may be blocked by the runner in lane 2 and thus his or her time may be only measurable in tenths of a second. The signals to the runners in lanes 4 and 6 will not be blocked by any other runner.

The transceiver 41 of the starter's gun 37 as shown in FIG. 9 may also be capable of receiving signals 50 transmitted by the transceiver 34 of the timing apparatus 10 (or 35) which comprises the finishing information of athletes including their times with or without their lane numbers. The starter's gun 37 may also allow for the entry by a coach or the like of an event type and enter the name of each runner in a lane of the event stored for example in a database prior to commencement of the event. Alternatively, the gun 37 may be provided with a card reader and athletes may be provided with a proximity card carrying the athlete's name so that that information can be downloaded into the database automatically when the gun 37 is placed in proximity to a card.

The finishing information which can thus be presented as the name of the runner, their place in the race and their finishing time can be displayed on a display screen such as an LCD display screen 43 provided on the starter's gun 37. The starter's gun 37 includes a controller/processor and memory similar to that contained in the timing apparatus 10 (or 35) and all the information transmitted by the apparatus 10 (or 35) can be received in the memory and displayed on the display screen 43. The coach or operator of the gun 37 thus receives the data immediately from the timing apparatus 10 (or 35) at the finish line 27 so that he can assess the results before the athlete returns. This finishing information of athletes can also be stored in a database in the memory of the starter's gun 37 so that a record of a particular runner in a series of training and/or racing events can be held for future reference and this information may be downloadable to other devices such as printers for printout or computers for historical storage records. This information may also be relayed to other compatible timing apparatus 10 (or 35) in the range and therefore increases the range over which this information can be transmitted (in addition to the range providing by the timing apparatus 10 (or 35)).

The starter's gun 37 also is provided with a series of control switches or buttons 44 similar to that contained on the timing apparatus 10 (or 35) including a stop button 45 and a reset button 46 which can be used to stop operation of the timing apparatus 10 (or 35) and transmit a reset signal to the timing apparatus 10 (or 35) after all the information of the previous race is recorded. The starter can thus remotely stop the apparatus 10 (or 35) and reset the apparatus 10 for the next race. All the information stored in the starter's gun 37 can then be downloaded as a printout or stored in a computer to which the gun 37 can be connected through output ports 47.

Figure 11:
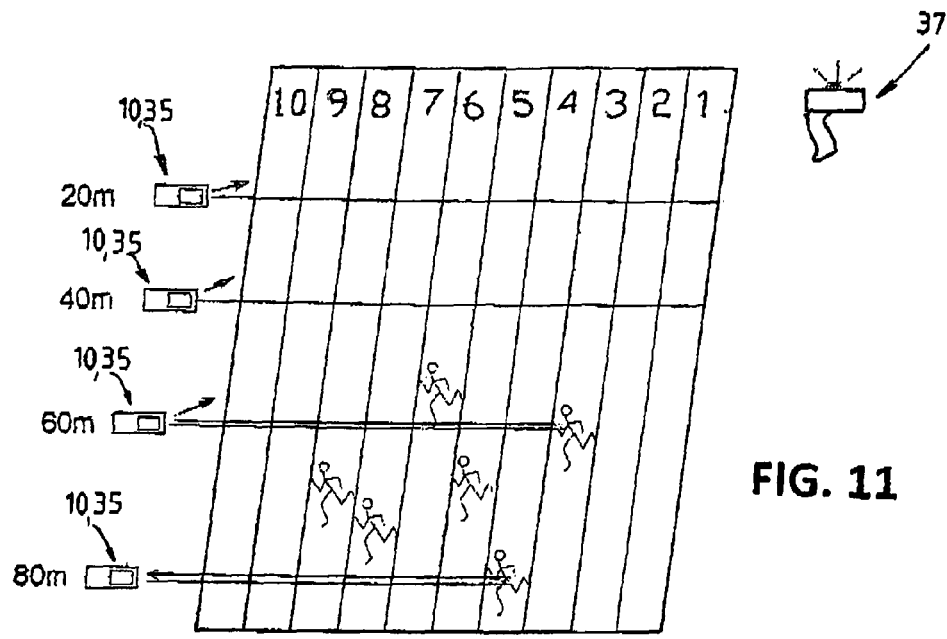
FIG. 11 illustrates schematically a timing system using a starter's gun and a plurality of timing apparatuses of the type described in FIG. 6 to achieve increment measurements.

In a further aspect of the invention illustrated in FIG. 11, a series of timing apparatuses 35 (or 10) can be set up along a track at set increments such as at 20 meter increments in a 100 meter race. A starter's gun 37 can as before transmit starting data to each apparatus 35 to commence timing upon triggering of the gun 37. As runners cross the laser beam emitted by each apparatus 35, each apparatus 35 will record the incremental time of each runner. This information can then be transmitted automatically back to the starter's gun 37 during the race. Thus the velocity of runners can he calculated from this information including velocity in the increments measured and the average velocity during the race. Whilst the timing apparatuses 10 or 35 are positioned at set increments along the track, each apparatus 10 or 35 may also include a GPS receiver for providing accurate positioning information of each apparatus 10 or 35. This position information can be transmitted back with incremental time information to the starter's gun 37.

A user of the starter's gun 37 thus has the ability as a single operator to start a race and through a tripod or stand mounted timing apparatus 10 (or 35) record the time (and lane) of each athlete as he or she crosses the finish or lap line 27 and then stop and reset the timing apparatus 10 (or 35). A coach may also stand on the finish or lap line 27 and use the gun 37 to start a race and then time the race using the timing apparatus 10 (or 35) whilst watching the athletes form at the finish line 27.

Figure 12:
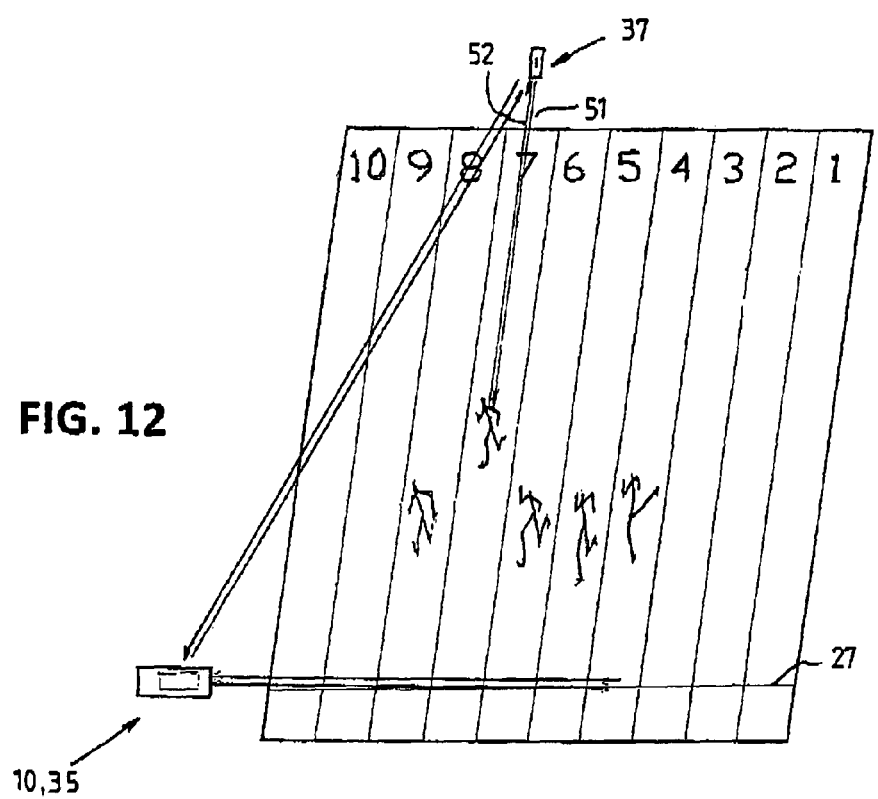
FIG. 12 illustrates the manner in which the starter's gun modified as shown in FIG. 9 can be used for single runner increment timing.

The starter's gun 37 can also be modified for a single runner increment timing application by including a laser beam transmitter 48 such as a laser diode and a laser beam receiver 49 such as a photo-detector with an associated lens as shown in dotted outline in FIG. 9. The laser beam emitted by the starter's gun 37 can thus be aimed at the rear of a runner as shown in FIG. 12 with the detected laser beam reflected from the athlete providing an indication of incremental elapsed time which can be displayed on the display screen 43 as the runner runs away from the starting line. A coach may thus start the race using the gun 37 and then use the gun 37 to aim the laser beam 51 emitted by the laser transmitter 48 along a lane 7 to strike an athlete in that lane and detect the reflected laser beam 52. At the same time starting operation of the gun 37 will also start the timing apparatus 10 (or 35) at the finish line 27. The transmitted laser beam 50 and reflected beam 51 will provide an indication of incremental times of an athlete during the race towards the finish line 27 which are displayed on the display screen 43. Thus times may be recorded as seconds over for example a ten meter split. Meters per second can also be calculated and additionally average velocity during the race can be calculated and displayed. Each incremental time of the runner in lane 7 for example can be recorded so that the coach will know of the incremental times for each part of the race for example for each ten meters of a 100 meter race. The coach will also have a record of the finishing times of each athlete as he or she crosses the finish line 27 as detected by the timing apparatus 10 (or 25 or 35) and transmitted back to the gun 37.

Whilst the timing system 38 is described to include a starters' gun 37 of the type described with reference to FIGS. 9 and 10, it may be used with other starting guns. For example, in blank firing starter's guns that use a transducer, an inline unit with stop reset could be use to wirelessly send start commands to the timing apparatus 10 (or 35). Alternatively a transducer that attaches to the barrel or some other part of a starting gun may be used to transmit the starting command or start signal for receipt by, to commence timing operation of, the apparatus 10 (or 35).

Figure 13:
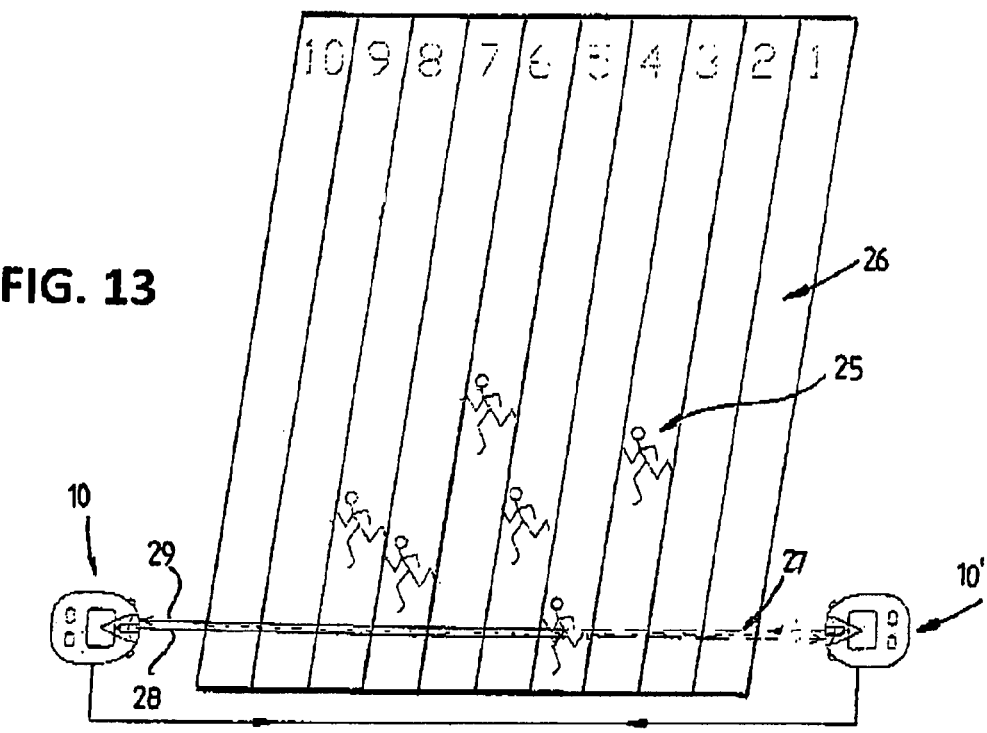
FIG. 13 illustrates schematically a timing system using a pair of timing apparatuses at opposite ends of a finish line used for achieving greater precision.

For more accurate recording of athletes in a race particularly where two or more athletes cross the finishing line 27 at substantially the same time, the apparatus 10 (or 35) may be set up in combination with another similar timing apparatus 10' (or 35) arranged on opposite side of the finishing line 27 as shown in FIG. 13. The timing apparatuses 10 and 10' may he interconnected through an electrical connection which comprises a wireless or infrared link. Each apparatus 10 and 10' is preferably set up in a fixed position for example on a stand such as a tripod and is arranged such that the apparatuses 10 and 10' can be triggered simultaneously by the starters gun 37 or self starter 32 as described above or other start device to commence the timing operation. Each apparatus 10 and 10' will detect an athlete crossing the finish (or lap) line 27 as athletes intercept the laser beams issued by each apparatus 10 and 10' however in the situation where a number of athletes cross the line 27 at a similar time, both apparatuses 10 and 10' will be able to detect all athletes as they cross the line 27. For example an athlete who cannot be "seen" from one apparatus 10 will be "seen" by the other apparatus 10'. The processor 15 in one of both apparatuses 10 or 10' will then be able to collate all the detected times and allocate the correct time to each athlete in turn.

Figure 14:
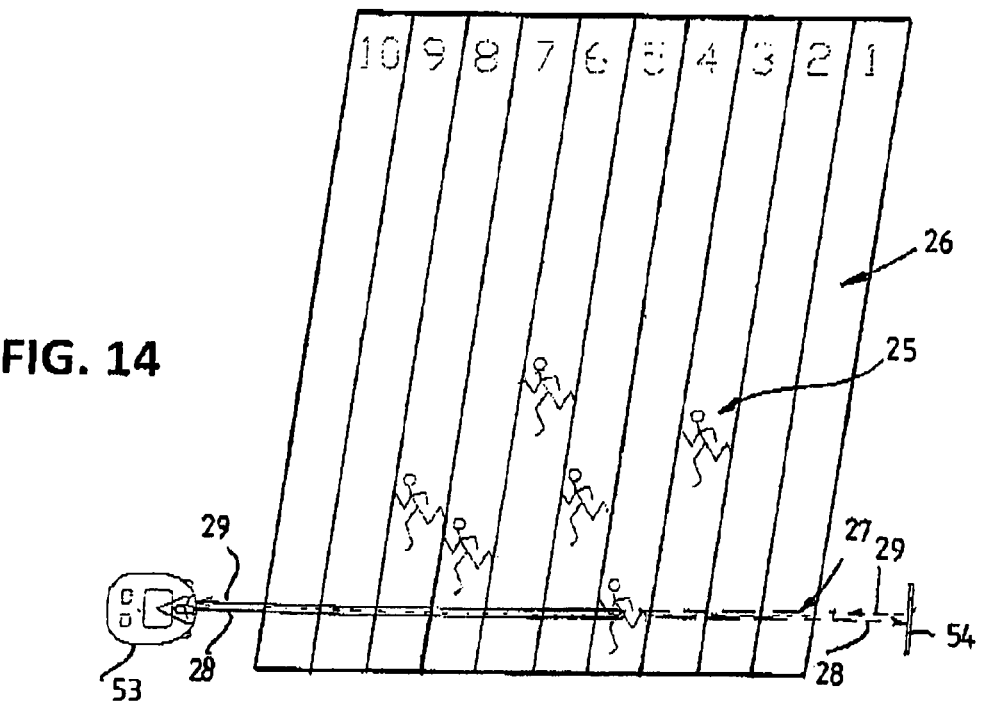
FIG. 14 illustrates a non modulated timing apparatus using a reflector.

In a further simplified form in which the timing apparatus 53 includes a non-modulated laser beam, a reflector 54 as shown in FIG. 14 can be set up on the opposite side of the finishing line 27 to reflect the laser beam transmitted from the apparatus 53 back to the apparatus 53 for receipt by the photo-detector 14. Thus when an athlete intercepts the beam, the detector of the apparatus 53 will detect non-receipt of the reflected beam from the reflector 54 therefore providing a reading of a finishing time for the athlete breaking the beam.

The timing apparatuses 10 and 35 described above may also include a password feature so that if used in an actual race, only the timing apparatus 10 (or 35) and/or starting gun 37 can send data between each other or other devices. Thus another timing apparatus 10 (or 35) in the range can not send its data to the official winning line timing apparatus 10 (or 35) or other official devices. The lock button or switch 21 of the timing apparatus 10 (or 35) may be actuated to lock out communication with unofficial apparatus so that unofficial apparatus could not be used in range of official timing apparatus or staring gun. In addition if multiple coaches are training different athletes on the same track, the signal from one starting gun will not be received or recorded by a timing apparatus not associated with that starting gun.

Whilst the timing apparatus 10 (or 35) and starter's gun 37 have been described to use wireless communications, other forms of communication may be used between apparatus 10 (or 35), starter's guns 37 or other receiving apparatus for example infrared transmission or by hard wiring.

The timing apparatus of the invention may be of various forms and configurations. For example, whilst the timing apparatuses of FIGS. 1 to 3 and 6 are shown to be actuated by manual buttons, they may be actuated by other means such as through a touch screen. In addition, where the apparatuses are used for lane detecting, they may be set up with custom settings with the width of each lane being settable and also the number of lanes being settable. Whilst the name of a runner and the lane they are in are usually stored in the starter's gun when used, that information may be entered into another device such as a PDA to allow for editing or downloading into the gun if required.

Figure 15:
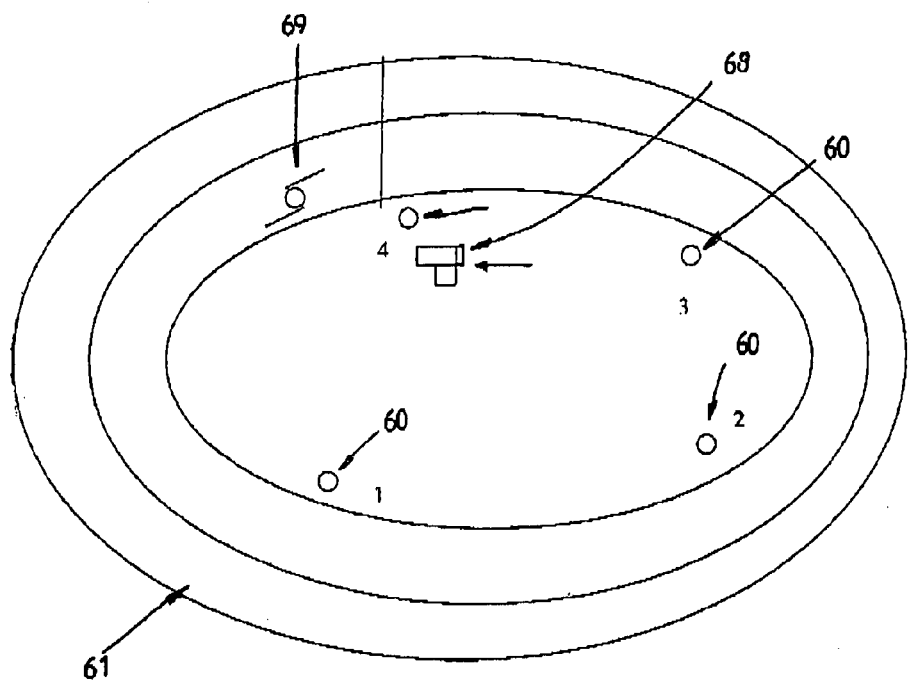
FIG. 15 illustrates schematically a running track provided with pacing apparatus according to another aspect of the invention.
Figure 16:
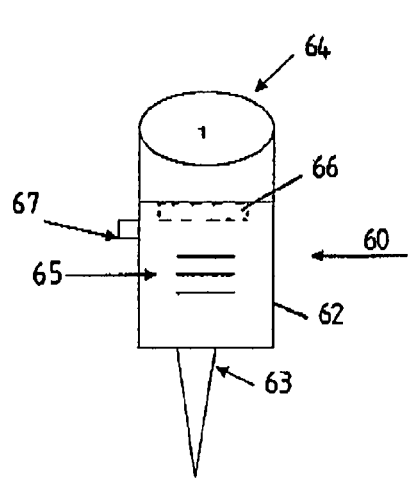
FIG. 16 illustrates schematically a light assembly for use in the pacing apparatus.

Further applications of the starter's gun 37 (without laser beam transmitter 48 and receiver 50) for use in pacing athletes are illustrated in FIGS. 15 to 19. In the embodiment of FIG. 15, a series of self-contained pacing light assemblies 60 are arranged at spaced usually equi-spaced positions around a running track 61. The pacing light assemblies 60 in the embodiment of FIG. 16 are portable units having a body 62 and a detachable spike 63 which enables the units to be driven into the ground at a selected location around the track 61. Alternatively the body 62 may be mounted on a tripod or other stand. The body 62 supports a light source 64 which may be illuminated or flashed as described below and additionally includes a sound generator 65 for generating a beep or other sound. Also arranged within the body 62 is a wireless receiver 66 for triggering the light source 64 and/or sound generator 65. The light assemblies 60 are preferably self-powered by an internal battery and typically include an on/off switch 67 on the body 62.

The starter's gun 37 is provided with a stop watch or timer 68 (illustrated schematically in FIG. 15) with readout similar to the display screen 43 to display to the starter, elapsed time. The user can select the training distance to be run and the target time for the distance, for example a 400 meter race in 60 seconds and enter this information into the starting gun 37. The number of pacing light assemblies 60 to be used can also be selected and entered into the gun 37. For example the user may select that four pacing light assemblies 60 are to be used. These assemblies 60 are then positioned at equi-spaced positions round the track 61 corresponding to the number of light assemblies selected. Thus when four light assemblies 60 are selected, they are placed at 100 meter intervals around the track 61. By entering the above information into the starter's gun 37, the gun 37 can calculate when to transmit an actuating signal to a pacing light assembly 60. In the above example, the starter's gun 37 will transmit a signal for receipt by a light assembly 60 every 15 seconds. Each light assembly 60 is given a specific address so that each light assembly 60 can be triggered in turn by the signals transmitted from the gun 37.

In use, a starter or coach at the start/finish line triggers the starter's gun 37 to initiate a starting light and/or beep from the gun 37 and also trigger the stop watch or timer 68 on or within the gun 37. A runner 69 will thus commence running around the track 61 and as programmed, the gun 37 will transmit a triggering signal after a first interval (in the above case after 15 seconds) to the first light assembly 60 indicated as "1". Upon the first light assembly 60 receiving that signal, the light source 64 will be illuminated momentarily as a flash and additionally a beep or other sound will issue from the sound generator 65. The runner 69 will see and/or hear the light and/or beep issuing from the first light assembly 60 and therefore be aware whether they are maintaining the set pacing. This procedure then continues for each light assembly 60 sequentially which will be triggered automatically by respective signals from the starter's gun 37. The runner 69 will thus be aware of his or her position as they run around the track 61 at each light assembly 60 and therefore be aware as to whether they are maintaining the desired pre-set pace or in front or behind the desired pace. The runner 69 can thus adjust the pace at which they are running to meet the set pace.

In the above example, the light assemblies 60 are triggered at set intervals. The starter's gun 37 however may be programmed to cause triggering of the light assemblies 60 at different non-equal increments to more closely simulate an actual race. Furthermore any number of light assemblies 60 as are practical may be used in the pacing application described.

Figure 17:
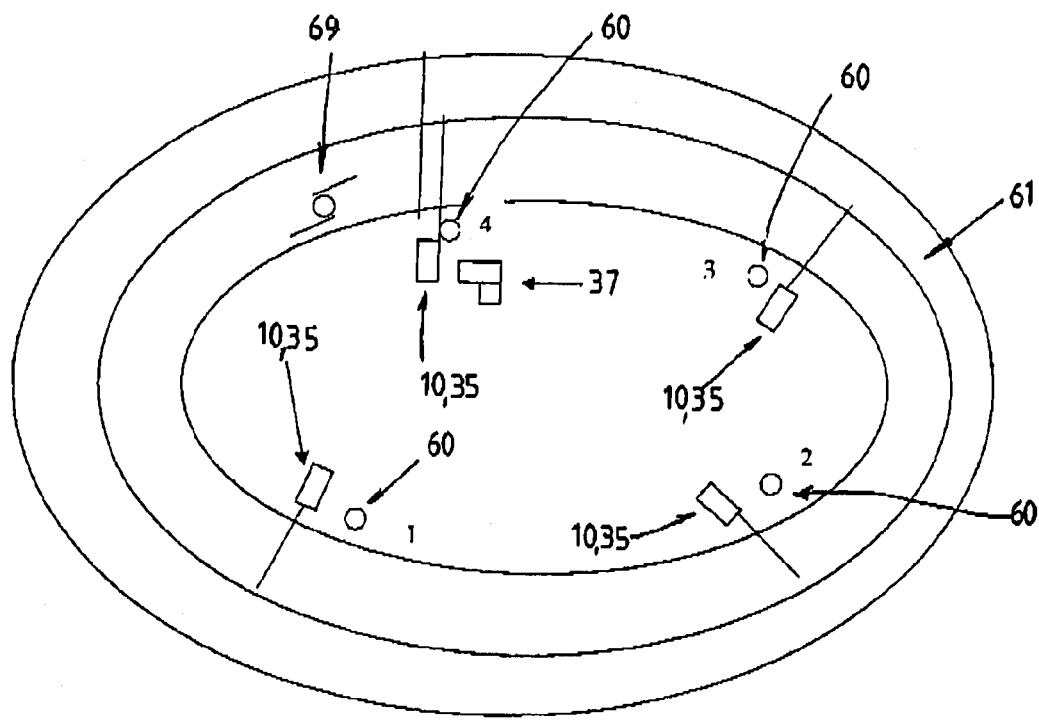
FIG. 17 illustrates schematically a running track provided with pacing apparatus and associated timing apparatus of the type described in FIG. 1 or FIG. 6.

In the embodiment shown in FIG. 17 in which like components to those previously described have been given the same numerals, in addition to the pacing light assemblies 60 positioned around the track, timing apparatuses 10 or 35 as described above may also be used in proximity to the light assemblies 60 to function as a measurement of time intervals in the manner described with reference to FIG. 11. Thus when the starter's gun 37 is used to start a pace training session on the track, a wireless signal 42 as previously described is also transmitted to the respective tuning apparatuses 10 or 35 to commence their timing operation. Runners 69 as they cross the laser beams transmitted by the timing apparatus 10 or 35 will be detected by each timing apparatus 10 or 35 to stop internal timers in the apparatus 10 or 35. This detected time is then transmitted back to the starter's gun 37 so that the runner's time as they pass the respective light assemblies 60 and timing apparatuses 10 or 35 will be received and stored in the gun 37. Thus the coach or starter will be able to monitor the pace at which the runner is running and their incremental time and further can stop the gun as the runner 69 crosses the finish line to record a finish time in the starter's gun 37.

Whilst the timing apparatuses 10 or 35 are preferably used adjacent to the pacing light assemblies 60, they alternatively may be placed at different locations around the track 61 from the light assemblies 60. The timing apparatuses 10 or 35 may be used in a range adjusted mode simply to detect any runner crossing the laser beam of the apparatuses 10 or 35 in a predetermined range or alternatively the timing apparatuses 10 or 35 may also be used to discriminate between and identify runners in respective lanes as also described previously. The name of runners can be previously input into the timing apparatuses 35 so that the detected increment time can be displayed against a runner's name.

Figure 18:
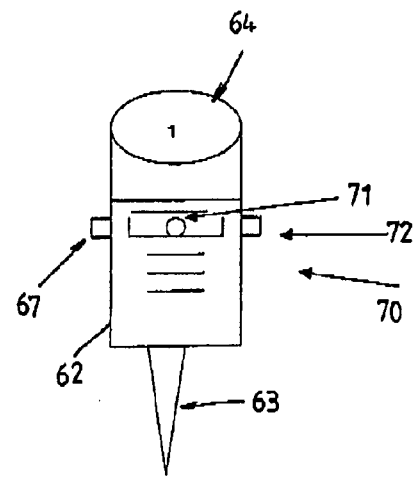
FIG. 18 illustrates schematically a light assembly for use in the pacing apparatus incorporating timing apparatus.

FIG. 18 illustrates a further form of light assembly 70 similar to the light assembly 60 described above and in which like components have been given like numerals. In this embodiment however, laser timing apparatus 71 similar to the apparatus 10 or 35 is incorporated within the body 62 of the assembly 70. The timing apparatus 71 can be used in a simple range adjusted mode to detect times of runners within that range as they cross the laser beam emitted by the timing apparatus 71. A range switch 72 is provided on the body 62 to enable the range at which runners are detected to be selectively varied for example at 1, 2, 5, 10 or 12 meters so that only runners in that selected range are detected.

Figure 19:
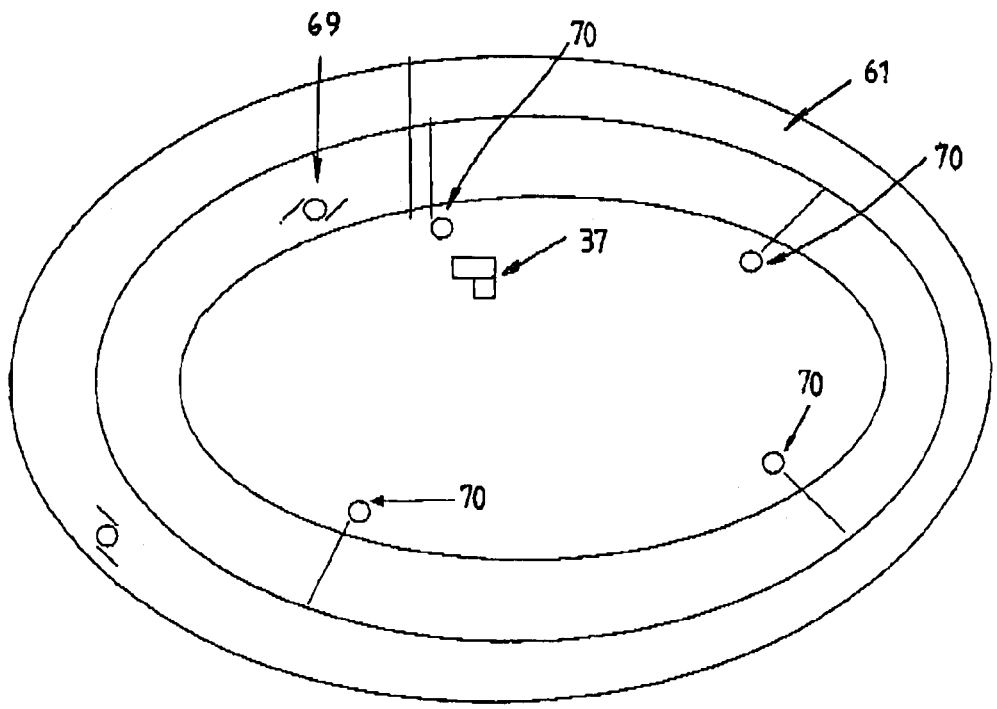
FIG. 19 illustrates the application of the light assembly of FIG. 18 to a running track.

Thus light assemblies 70 are set up around the track 61 as shown in FIG. 19 in the same manner as that described with reference to FIG. 15 with each timing apparatus 71 triggered wirelessly by the gun 37 and incremental time signals or runners as they pass each timing apparatus 71 being transmitted by the timing apparatus 71 back to the gun 37 to be recorded therein. Further the light assemblies 70 are triggered to flash and/or beep by the starter's gun 37 at pacing intervals to set a desired pace in the same manner as described with reference to FIG. 15

In each of the above apparatuses where laser beams are transmitted, the laser beam may be visible to set but may be invisible in use so as to not cause danger to athletes or runners. Further the light assemblies 60 or 70 may include GPS receivers as described above for providing accurate positioning information.

Figure 20:
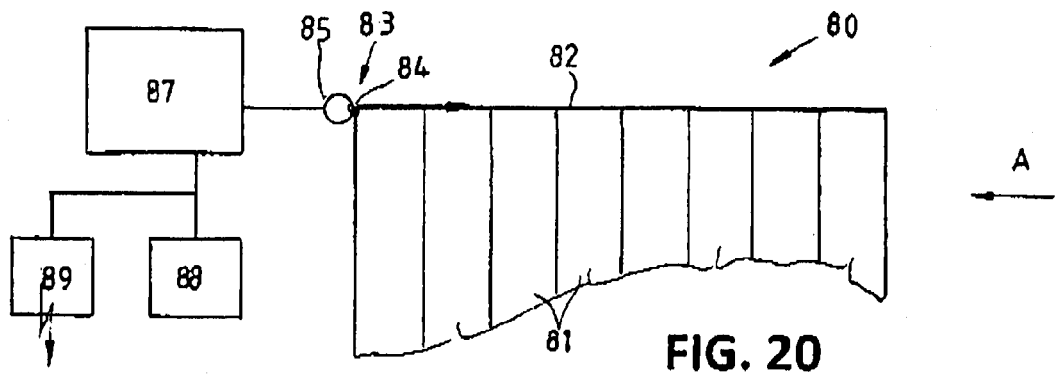
FIG. 20 illustrates schematically the finish line end of a running track provided with the timing and detection apparatus according to another embodiment of the present invention.

FIG. 20 illustrates a further embodiment of the invention applied to a multilane running track 80 having a plurality of lanes 81 and a finish line 82. Arranged at one end of the finish line is a laser beam transmitter/receiver unit 83 of timing apparatus for detecting athletes or runners cross the finish line 82, the unit 83 comprising a plurality of laser beam transmitters 84 for transmitting respective laser beams across the track 80 and in vertical alignment with and substantially parallel to the finish line 81. Each laser beam transmitter/receiver unit 83 functions in a similar manner to the apparatus 10 or 35 of FIGS. 1 to 3 or FIG. 6. The laser beam transmitters 84 are mounted on an upstanding finish post 85 one above the other (see FIG. 21) such that a series of laser beams can be transmitted across the track 80 in different horizontal planes. A plurality of laser beam receivers 86 are also provided on the post 85 being associated with respective transmitters 84 for receiving the reflected beams from respective transmitters 84. Usually the laser beam transmitters 84 are arranged to transmit pulse modulated laser beams across the track 80.

A signal processing unit in the form of a programmed computer 87 is provided to process the signals received from the laser beam receivers 86 and can provide an output to a display or printer 88. Alternatively or additionally an output from the computer 87 may be sent by a wireless transmitter 89 as a wireless signal for receipt and display on suitable portable receivers which for example may comprise mobile phones or any other remote receiver. Thus instantaneous results can be received and displayed on such receivers. In addition, the computer 87 may be triggered by a starting signal in a race to calculate elapsed time of an athlete or runner in the race so as to enable not only finishing order of persons in the race to be determined when they cross the finish line 82 but also their finishing time.

Figures 21, 22:
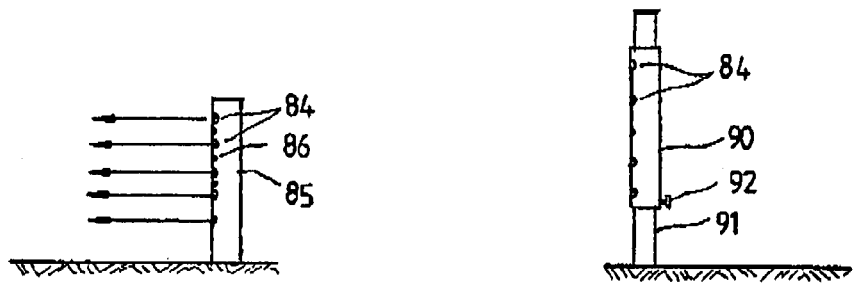
FIG. 21 is an end view in the direction A of FIGS. 20 showing a finishing post of the track.
FIG. 22 illustrates in a view corresponding to FIG. 20 a modified form of detection apparatus according to the present invention.

In the illustrated embodiment of FIGS. 20 and 21, the laser beam transmitters 84 are arranged at a vertical spacing of approximately 10 cm however this may vary. The central transmitter 84 is preferably arranged at the mid-range height of athletes or runners of a range different heights so as to enable the torso of an athlete or runner to be correctly detected.

In use, the transmitters 84 are arranged to transmit a plurality of synchronised laser light pulses across the finish line which when a runner crosses the finish line 82 are reflected for receipt by the laser receivers. As a series of laser beams are transmitted, a series of laser beam signals are reflected from runners for receipt by the respective laser beam receivers 86. The received signals are processed by the computer 87 which for example by counting the number of pulses received at different heights can determine which received signals represent the torso of the body of the athlete or runner. The plurality of laser beams transmitted one above the other effective form a finish plane through which runners or athletes pass at the finish line 82. The computer 87 can by counting the received pulses determine which part of the body is the torso (in which case a large number of reflected pulses will be received and counted) and which part of the body is not the torso for example an arm (in which case a substantially smaller number of reflected pulses will be received and counted).

In addition, the laser beam receivers can detect and identify runners in different lanes by using time of flight techniques as described previously. Thus reflected signals from runners in lanes remote from the unit 83 will take longer to be received by the receivers than signals reflected form runners in lanes closer to the unit 83.

The computer 87 will thus able to determine placings in a race by correctly identify the torso of a person crossing the line 82 and also detect their finishing order and finishing time as referred to above. The names of runners or athletes previously entered into the computer 87 can thus be placed in order with their times and output to the printer/display 88 and/or transmitter 89.

To enable further adjustment for athletes or runners of different heights for example for use with children of a range of heights, the transmitter/receiver unit 83 may be mounted on a separate elongated member 90 (see FIG. 22) which is supported for vertical adjustable or sliding movement in opposite directions on an upright post 91 which is used in place of the finish post 85. Locking means 92 are provided between the member 90 and post 91 for selectively locking the member 90 at a desired height depending upon the range of heights of runners or other athletes.

Figure 23:
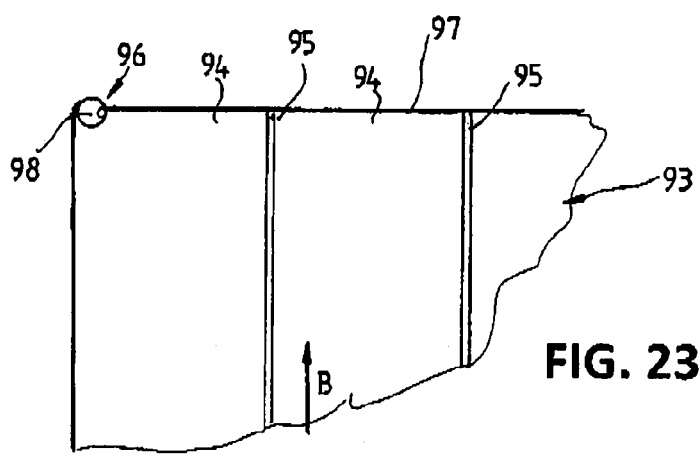
FIG. 23 is a plan view of an end of a swimming pool provided with the timing and detection apparatus according to yet another embodiment of the invention.
Figure 24:
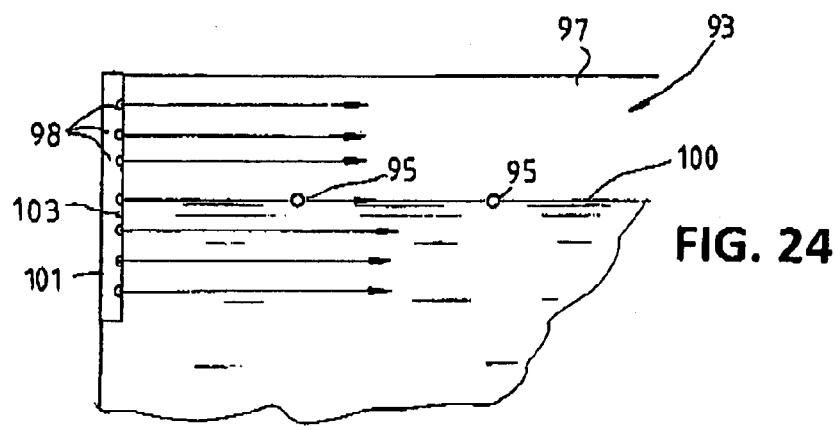
FIG. 24 is an end view in the direction B of FIG. 3.

Referring now to FIGS. 23 and 24 there is illustrated an application of the present invention to a swimming pool 93 to enable detection and timing of swimmers in a swimming race for example swimming in different lanes 94 delineated by lane markers 95 in the pool 93. In this application, a laser beam transmitter/receiver unit 96 similar to the unit 83 is provided at the finishing wall 99 of the pool and typically at one side of the wall 97. As above, the unit 96 includes a plurality of laser beam transmitters 98 arranged vertically one above the other and associated with respective laser beam receivers or detectors, the laser beam transmitters 98 being arranged to transmit a series of laser beams across the pool 93 and immediately adjacent to the wall 97. The laser beam transmitters 98 are suitably arranged to so as to be both above the level or water line 100 of pool water and below the level of the pool water so as to detect not only persons touching the wall below water level but above the water level. Thus the laser beam transmitters 98 effectively form a laser plane which is penetrated by the hand or part of the hand of swimmers either above or below the water line 100. Typically the units 96 include elongated support members 101 which incorporate the laser beam transmitters 98 (and associated receivers), the elongated support member 101 being mounted to a wall of the pool 93. Alternatively the transmitters 98 (and receivers) are incorporated into the pool wall.

The unit 96 will thus be able to detect by receipt by the laser receivers or detectors of reflected laser beam signals transmitted by the transmitters 98 which have been reflected by striking a leading part of a swimmer typically a finger, hand or wrist. Thus the placings in a swimming race will be able to be determined with for example time of flight techniques being used to detect different swimmers in different lanes 94.

As described above with reference to FIGS. 20 to 22 a programmed computer or processor may be used to process the signals and provide output placings and times presented on a printout, on a display screen or to a wireless transmitter for transmission of wireless signals for receipt by suitable receivers such as a mobile phone, I-phone etc. Thus when the start of a race is commenced for example by a starting gun, a time clock of the computer or processor is also triggered for example by being connected directly or wirelessly to the starting gun. The computer or processor will thus count up the time for each swimmer until that swimmer is detected at the finishing wall by the laser receiver or detector which also triggers a stop signal for timing of the swimmer.

Figure 25:
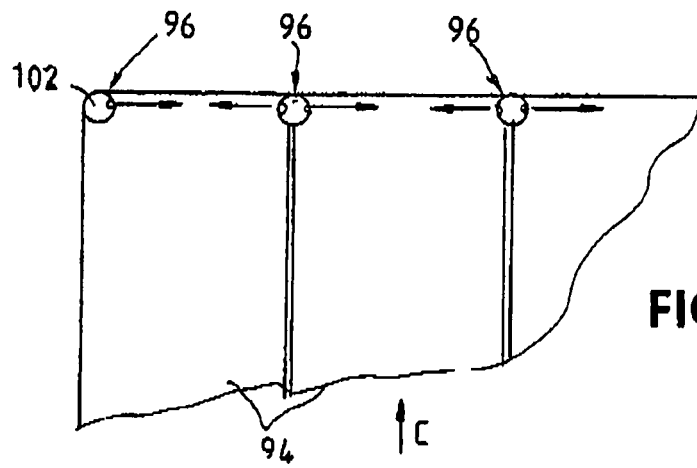
FIG. 25 is a plan view of an end of a swimming pool provided with the timing and detection apparatus according to a further embodiment of the invention.
Figure 26:
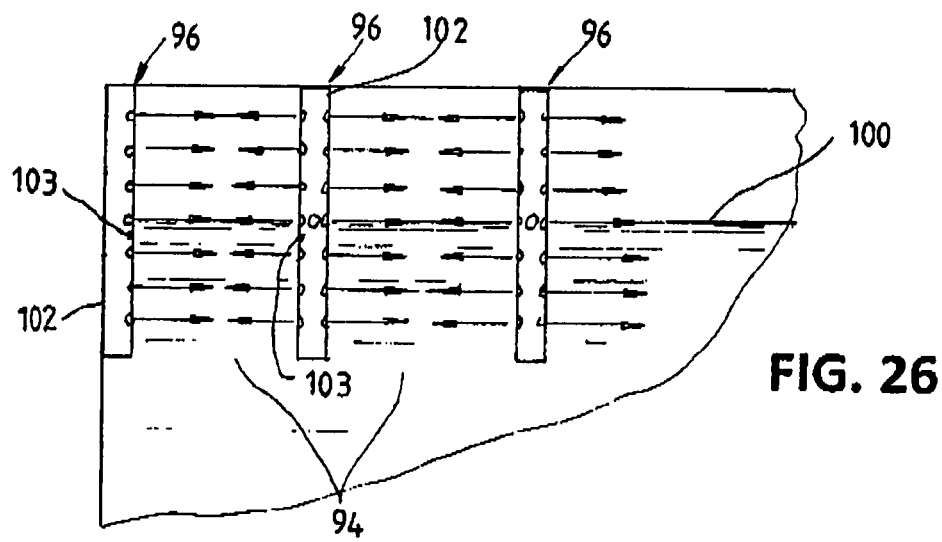
FIG. 26 is an end view in the direction C of FIG. 25.

For more accurate detection of swimmers, respective units 96 may be associated with each lane 94 being provided adjacent a lane marker of the lane 94 to transmit laser beams across the lane 94 as shown in FIGS. 25 and 26. In the arrangement of FIG. 26, the upright support members 102 which carry the respective laser transmitters 98 may be provided on each side of a lane 94 such that the laser transmitters 98 transmit laser beams towards each other. Support members 102 common to each lane 94 may carry laser transmitters 98 on each side. The support members 102 may be hollow members in or one which the laser transmitters 98 (and receivers) may be mounted.

Alternatively and as shown in FIG. 8, the laser beam transmitters are arranged to transmit interleaved laser beams.

In each of the above arrangements, infrared detectors 103 may also be provided on the support members 101 so as to detect the heat of swimmers and discriminate reflected signals received by the laser receivers from extraneous reflected signals such as signals from bubbles in the water.

Figure 29:
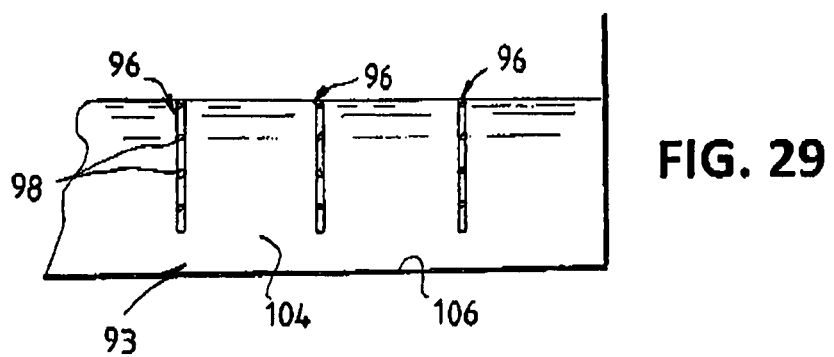
FIG. 29 is a view in the direction D of FIG. 28.
Figure 30:
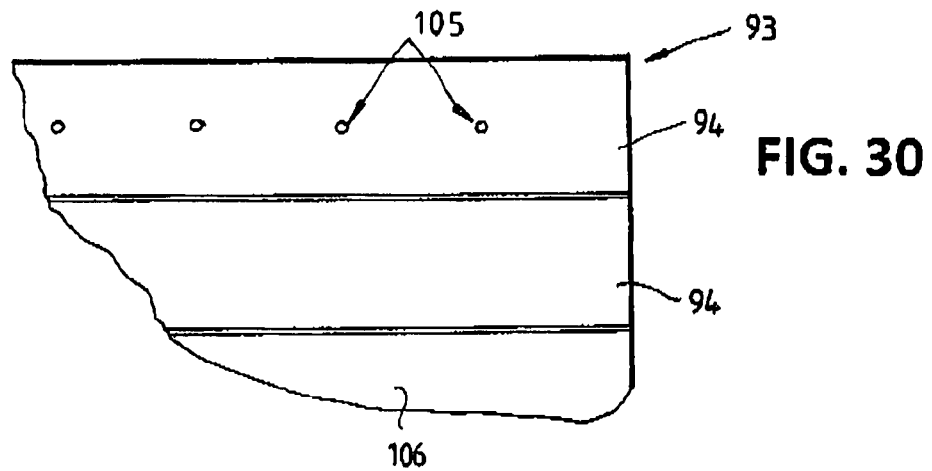
FIG. 30 illustrates a plan view of portion of the swimming pool with an alternative detection apparatus.

The laser transmitter/receiver units 96 may also be used in the configuration of FIG. 29 at spaced positions along a side wall 104 of the pool 93 to detect swimmers at different incremental distances along the pool 93. Reflected signals from swimmers in the pool 93 will be received by the receivers or detectors of the units 96 to enable the incremental speed of a swimmer between respective units 96 to be determined.

To enable detection of swimmers swimming in a single lane, the swimmers may carry identification tags, bar codes or the like which can be read or excited by the transmitted laser beams so that respective swimmers can be determined and associated with respective times.

By use of a sufficient number of laser transmitters 98 arranged one above the other and sufficient sampling speed that is pulse transmission rate by the transmitters 98, the depth of a swimmer can also be determined by detecting laser beam signals from one or more the transmitters 98 reflected from the swimmers. This is particularly important at the start end of a pool or the turn end of the pool as the trajectory of the swimmer can be simply determined upon for example diving into the pool.

As an alternative arrangement for detecting swimmers in a swimming pool, laser beam transmitters 105 (and associated receivers or detectors) may be provided in or on the floor 106 of the pool 93 at spaced apart positions along the pool 93. Thus as a swimmer passes over a transmitter 105, the laser beam will be reflected and received by the receiver or detector. As above, to discriminate between different swimmers, swimmers may carry identification tags, bar codes or the like which can be read or excited by the transmitted laser beam to be read by the receivers. Further to ensure that swimmers across a lane can be detected, the laser beams transmitted by the transmitters 105 may be such as to span a lane 94. Thus for example, the beams may be of a fan-shaped configuration transversely of a lane.

Typically the laser transmitters transmit a modulated light beam such as a pulse modulated light beam however in some circumstances the transmitters may transmit a non-modulated light beam for example where the timing apparatus or laser stopwatch is used in association with a reflector to reflect the transmitted beam.

The present invention thus provides timing apparatus which may be in the form of a stop watch which is particularly but not exclusively suitable for use by sprint coaches which uses laser optical measurement techniques and which requires minimum set up time and which may be used in one aspect in substitution for known stopwatches. Laser optical measurement techniques can be used for acquiring finishing times and places of runners in a race on a running track or in any other location. Further the apparatus may use laser optical measurement techniques for acquiring finishing times and places of runners in respective lanes of a running track. The timing apparatus may be used in a timing system which includes means for triggering the timing apparatus. The starting gun used in the system may be used independently as timing apparatus or in a timing system of the above described type.

As applied to athletes or runners moving or running in different lanes, the present invention comprises a timing apparatus in the form of a stopwatch incorporating a laser beam transmitter and receiver which uses distance measuring techniques to determine elapsed time and runners in a lane without identifying the runners. The apparatus may be applied to situations where manual stopwatches are commonly used, particularly sprints on oval laned tracks, grass or synthetic. The apparatus may include range adjustment or determining means to ensure that only athletes or runners within particular ranges corresponding to different lanes are detected The apparatus may be provided with wireless communication means such as wireless transceiver means for receiving data from a starter or transmitting data for example elapsed time and runner data to a remote location. The timing apparatus may be associated with a self starting device which can wirelessly communicate with the timing apparatus. The starter alternatively may be a starter's gun which can issue a beep and/or flash for starting a race and which includes wireless transmitter means for transmitting data including starting date to the timing apparatus. A plurality of timing apparatuses may be provided in a cascading arrangement at regular positions along a track and the starter can transmit starting data to each timing apparatus to enable time increments of athletes to be measured along the track. For more accurate detection of runners crossing a fishing line to ensure that obstructed runners are detected, a pair of timing apparatus may be provided at opposite sides of a finish line or track. The apparatus when set up in this configuration may be used with a starting gun as described above or a blank firing gun. The timing apparatus may be used in combination with a known blank firing gun for starting a race with the timing apparatus triggered manually by a finishing judge upon hearing the firing of the gun.

In another aspect, the timing apparatus may be incorporated in a beep and flash starter gun as referred to above and the gun may be used by aiming the laser beam from the starter's line at the rear of a runner to measure time increments of the runner running away from the starting line. In a simplified aspect, the timing apparatus may be used in combination with a reflector on the opposite side of a finish line for reflection of the laser beam back to the timing apparatus except where intercepted by a runner crossing the finish line.

Thus the apparatus of the present invention may be applied to determine the finishing order and time of the finishers in athletic or swimming competitions however the apparatus of the present invention may also be used to detect and/or time competitors such as athletes or swimmers at different incremental positions along a track or swimming pool during competitions and training or for any other timing application.

Figure 27:
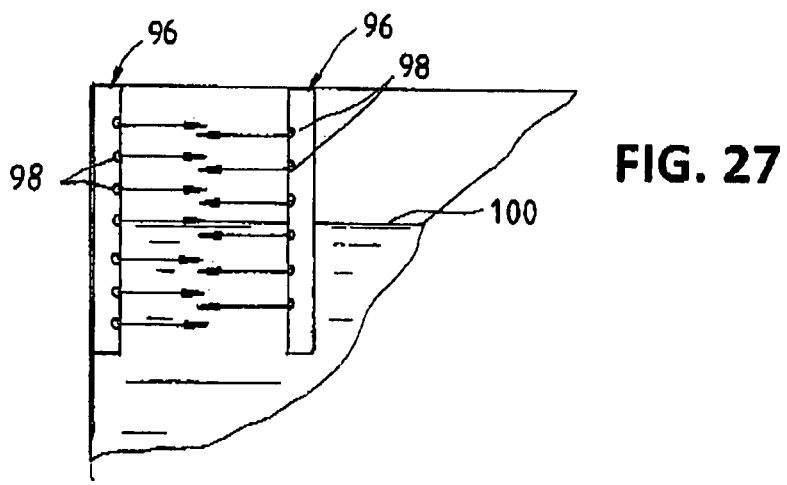
FIG. 27 is an end view corresponding to FIG. 26 of an alternative timing and detection apparatus.
Figure 28:
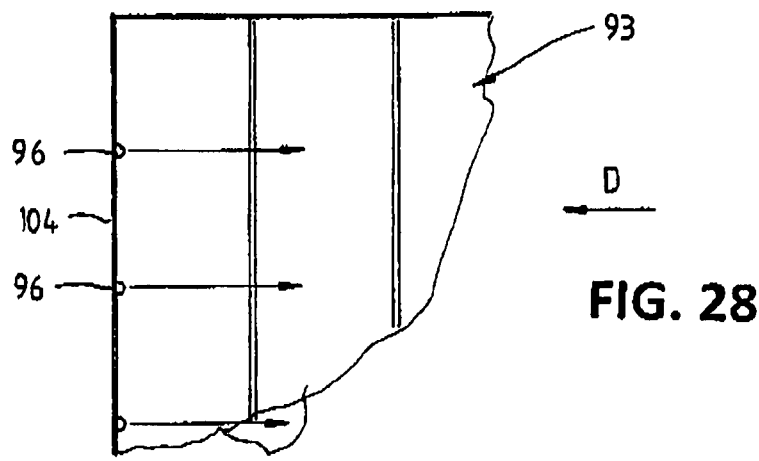
FIG. 28 is a plan view of part of a side of a swimming pool showing the timing and detection apparatus arranged along a side wall of a pool.

A further application of the present invention is in horse racing where regularly dead heats occur and where large sums of money depend upon accurate results being obtained. In application to horse racing, the apparatus may be set up in a similar manner to that described with reference to FIG. 13 on opposite ends of a finish line. It is preferred however in this application that a series of vertically spaced timing apparatuses of the type described above at the finish line at opposite sides of the track for example in an arrangement similar to that described with reference to FIGS. 26 and 27. Thus using this arrangement, the finishing order of horses, their finishing time and the position across the track can be determined using the above described techniques.

It will be appreciated that the configuration of the apparatus may be substantially different from that described and illustrated in the embodiments. Where pulse modulated laser beams are employed, the frequency of modulation is typically 1000 Hz however it will be appreciated that the frequency may be higher or lower that this frequency. Higher frequencies will provide more accurate readings.

The reference to prior art in the above description is not to be taken as an admission that the described prior art constitutes common general knowledge in the art.

The terms "comprising" or "comprises" or derivatives thereof as used throughout the specification and claims are taken to specify the presence of the stated features, integers and components referred to but not preclude the presence or addition of one or more other feature/s, integer/s, component/s or group thereof.

Whilst the above has been given by way of illustrative embodiment of the invention, all such variations and modifications thereto as would be apparent to persons skilled in the art are deemed to fall within the broad scope and ambit of the invention as herein described in the appended claims.

The invention claimed is:

1. Apparatus for determining the elapsed time of movement and identifying each of a plurality of movable objects travelling or moving in separate lanes, said apparatus comprising at least one laser beam transmitter for transmitting modulated laser beam signals across said lanes, a detector for detecting the interception by each said object of said transmitted laser beam by the receipt of respective reflected laser beam signals from each said object, and processor means which determines from the time between transmission of said laser beam signals and receipt by said detector of reflected signals from respective said objects, the identity of said objects and/or the lanes of said objects, said processor means further determining from said received reflected laser beam signals, said elapsed time of each said object.

2. Apparatus as claimed in claim 1 in combination with display means for displaying said elapsed times and the identity of said objects and/or lanes of said objects, wherein said display means comprises remote display means, and wherein said remote display means comprises one of a LCD screen, a touch screen or means for displaying and/or printing said elapsed times and the identity of said objects and/or lanes of said objects.

3. Apparatus as claimed in claim 2 and including communication means for communicating said apparatus with said display means, and wherein said communication means comprises wireless communication means, and further including a memory for storing said elapsed times and the identity of said objects and/or lanes of said objects.

4. Apparatus as claimed in claim 3 and including a support body for said laser beam transmitter, said detector and said processor means whereby said apparatus is self-contained and may be hand-held.

5. Apparatus as defined in claim 4 and including a timer associated with said processor means for measuring or determining said elapsed times, and wherein said elapsed times are determined from a start time.

6. Apparatus as claimed in claim 5 and including a start button for manually setting said start time and wherein said start time is set by remote start time setting means.

7. Apparatus as claimed in claim 6 wherein said at least one laser beams transmitter is adapted to transmit pulse modulated laser beam signals, wherein said pulse modulated laser beam signals comprises plurality of pulses which will be reflected by objects intercepting said transmitted laser beam signals and wherein said processor means is adapted to identify said objects from said reflected pulses by using distance measurement to identifying said objects by the distance of said objects from said apparatus.

8. Apparatus as claimed in claim 7 wherein said processor means is adapted to identify an object from the number of pulses reflected from an object.

9. Apparatus as claimed in claim 8 wherein said objects comprise athletes or runners and wherein said apparatus is positioned such that said laser beam transmitter can transmit said laser beam signals across a finishing or incremental line, and wherein said processor means is adapted to determine the finishing or incremental order of athletes or runners crossing said line by the detecting of the longest group of reflected signals reflected from and corresponding to the torso of said athletes or runners.

10. Apparatus as claimed in claim 9 wherein said at least one laser beam transmitter comprise first and second laser beam transmitters arranged on opposite sides of said lanes for transmitting laser beam signals in opposite directions across said lanes.

11. Apparatus as claimed in claim 10 wherein said objects comprise swimmers and wherein said lanes comprise lanes of a swimming pool, and including a plurality of laser beam transmitters, said laser beam transmitters being located vertically one above the other to transmit a plurality of vertically spaced laser beam signals across said lanes, wherein said laser beam transmitters and detectors for reflected laser beam signals include laser beam transmitters and detectors arranged above and below the level of water in said swimming pool.

12. A timing system comprising apparatus as claimed in claim 11 and further including remote actuating means for setting a start time of movement of said movable objects.

13. A timing system as claimed in claim 12 wherein said remote actuating means comprises a starting gun adapted to emit a visible and/or audible starting signal for starting an athletic or other competition in which said objects are participating, said starting gun being adapted when issuing said starting signal to simultaneously transmit a triggering start time signal for receipt by said apparatus, and wherein said starting gun includes means to transmit data for receipt by said apparatus.

14. A timing system as claimed in claim 13 wherein said starting gun includes display means and wherein said timing apparatus is adapted to transmit elapsed time and/or object identification signals to the starting gun for display on the display screen of the starting gun.

15. A timing system as claimed in claim 13 wherein said remote actuating means comprises a self starter, said starter being adapted to emit a visible and/or audible starting signal and transmit simultaneously a triggering start time signal to said apparatus to set a start time for movement of said objects, and wherein said apparatus and said remote actuating means include transceivers to permit wireless communications therebetween.

16. A timing system as claimed in claim 15 wherein said timing apparatus includes a support body, said support body being adapted to be hand held or supported by a support structure.

17. A laser stopwatch comprising a support body adapted to be hand held, said support body supporting a laser beam transmitter for transmitting pulse modulated laser beam signals, a detector for detecting a reflected laser beam signals, a timer for measuring an elapsed time of movement of objects from a start time, and processor means which measures the time between the transmission of said laser beam signals and the receipt of corresponding reflected signals to enable the identification of objects from which said laser beam signals are reflected, said processor means being further adapted to calculate from said received reflected signals, the said elapsed time of each of said objects.

18. A laser stopwatch as claimed in claim 17 wherein said support body includes display means for displaying said elapsed time or times and the said lanes and/or objects in said lanes, and wherein said support body includes means for manually setting the start time.

19. A laser stopwatch as claimed in claim 18 and including communication means for providing communication of said laser stopwatch with remote actuation means adapted to remotely set said start time, and wherein said communication means is adapted to communicate a start signal to said stopwatch from a remote starter, and preferably or optionally said remote starter comprises one of a starting gun or an automatic self-starter.

20. A method of determining an elapsed time of movement and the identification and order of a plurality of movable objects moving in respective lanes and passing a selected location, said method including the steps of transmitting laser beam signals across said lanes at said location and thereby across the path of movement of said objects, and calculating said elapsed time of each said movable object and the identity of each said object by detecting from receipt of reflected said signals from respective objects due to the interception of said objects of a laser beam transmitted by said laser beam transmitter, the elapsed time of each said object and the identity of each said object and/or lanes of each said object from time between transmission of said signals and receipt of reflected said signals from each said object.

21. A method as claimed in claim 20 wherein the step of transmitting the laser beam signals comprises the step of transmitting pulse modulated laser beam signals.

22. A method as claimed in claim 21 wherein the step of identifying the objects comprises the step of by calculating the distance of said object or objects across the lanes.

23. A method as claimed in claim 22 wherein the step of identifying the distance of said object across the lanes comprises the step of using time of flight calculations or triangular calculations to identify said distance.

* * * * *